United States Patent
Miyatani

(10) Patent No.: US 10,420,124 B2
(45) Date of Patent: Sep. 17, 2019

(54) REMOTE NODE, CENTER NODE, COMMUNICATION SYSTEM, COMMUNICATION TERMINAL, AND COMMUNICATION METHOD

(71) Applicant: NEC Corporation, Tokyo (JP)

(72) Inventor: Tetsuhiko Miyatani, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/667,839

(22) Filed: Aug. 3, 2017

(65) Prior Publication Data

US 2018/0042034 A1 Feb. 8, 2018

(30) Foreign Application Priority Data

Aug. 4, 2016 (JP) .................................. 2016-153795

(51) Int. Cl.
| | | |
|---|---|---|
| *H04W 72/12* | (2009.01) | |
| *H04L 1/18* | (2006.01) | |
| *H04L 29/06* | (2006.01) | |

(52) U.S. Cl.
CPC ......... *H04W 72/121* (2013.01); *H04L 1/1812* (2013.01); *H04W 72/1263* (2013.01); *H04L 67/40* (2013.01)

(58) Field of Classification Search
CPC ............ H04W 72/121; H04W 72/1263; H04L 1/1812; H04L 67/40
See application file for complete search history.

(56) References Cited

U.S. PATENT DOCUMENTS

| | | | | |
|---|---|---|---|---|
| 2010/0265842 | A1* | 10/2010 | Khandekar | ....... H04W 72/0433 370/252 |
| 2012/0122462 | A1* | 5/2012 | Guey | .................. H04W 72/121 455/450 |
| 2016/0029395 | A1* | 1/2016 | Kim | ....................... H04J 11/004 370/329 |
| 2018/0069664 | A1* | 3/2018 | Khoryaev | ............. H04L 1/1621 |

OTHER PUBLICATIONS

3GPP TR 38.801, V0.2.0 (Jun. 2016), Technical Report, 3rd Generation Partnership Project; Technical Specification Group Radio Access Network; Study on New Radio Access Technology; Radio Access Architecture and Interfaces (Release 14), 20 pages.

* cited by examiner

*Primary Examiner* — Lakeram Jangbahadur
(74) *Attorney, Agent, or Firm* — Sughrue Mion, PLLC

(57) ABSTRACT

A remote node capable of reducing the effect of an increase in a processing time that occurs when a C-RAN structure is applied and efficiently performing scheduling of radio resources is provided. A remote node 10 according to the present disclosure includes a scheduler 11 configured to perform scheduling for a first radio resource among radio resources available for radio communication, the first radio resource being a radio resource designated in advance by a center node 20, and a communication unit 12 configured to perform radio communication with a communication terminal 30 by using the first radio resource or a second radio resource among the radio resources available for radio communication, the second radio resource being a radio resource for which scheduling has been performed by the center node 20.

11 Claims, 20 Drawing Sheets

REMOTE NODE, CENTER NODE, COMMUNICATION SYSTEM, COMMUNICATION TERMINAL, AND COMMUNICATION METHOD

INCORPORATION BY REFERENCE

This application is based upon and claims the benefit of priority from Japanese patent application No. 2016-153795, filed on Aug. 4, 2016, the disclosure of which is incorporated herein in its entirety by reference.

BACKGROUND OF THE INVENTION

1. Technical Field

The present disclosure relates to a remote node, a center node, a communication system, a communication terminal, a communication method, and a program. In particular, the present disclosure relates to a remote node, a center node, a communication system, a communication terminal, a communication method, and a program for performing mobile communication.

2. Background Art

Currently, a base station used in a radio communication system includes a baseband process unit that collectively performs processes in a Layer-1 process part and a Layer-2 process part. Processes related to a physical layer are performed in the Layer-1 process part and processes for controlling the physical layer are performed in the Layer-2 process part.

Meanwhile, as the number of antennas and the width of a system radio frequency band will increase in radio communication systems in the future, application of a C-RAN (Centralized Radio Access Network) structure in which the Layer-1 process part and the Layer-2 process part are separated from each other has been studied. For example, 3GPP TR 38.801 V0.2.0 (2016-06) (hereinafter referred to as "Non-patent Literature 1") discloses the C-RAN structure. In Non-patent Literature 1, the Layer-1 process part is described as a "Distributed Unit" or "Lower layers of NR (New Radio) BS (Base Station)" and the Layer-2 process part is described as a "Central Unit" or an "Upper Layer of NR BS". Non-patent Literature 1 discloses a configuration in which a plurality of Distributed Units connect to one Central Unit.

Further, Non-patent Literature 1 also discloses an example of a function distribution between the Central Unit and the Distributed Unit. For example, Non-patent Literature 1 mentions that a function that is executed in a MAC (Medium Access Control) layer, such as an HARQ (Hybrid Automatic Repeat Request), is installed in the Distributed Unit. By installing the function related to the HARQ in the Distributed Unit as described above, a signal transmission between the Distributed Unit and the Central Unit in a resending process is omitted and hence an increase in the resending process time can be prevented.

SUMMARY

A plurality of Distributed Units are connected to a Central Unit. Therefore, the Central Unit performs scheduling (i.e., makes out schedules) of radio resources that are used in respective Distributed Units so that each of the Distributed Units can efficiently use the radio resources. Meanwhile, when the function related to the HARQ is installed in the Distributed Unit as disclosed in Non-patent Literature 1, the Distributed Unit performs scheduling of radio resources related to resending control without requiring control performed by the Central Unit. In this case, there is a problem that the scheduling in the Distributed Unit could be inconsistent with the scheduling in the Central Unit and hence the radio resources cannot be efficiently used.

An example object of the present disclosure is to provide a remote node, a center node, a communication system, a communication method, and a program capable of reducing the effect of an increase in the processing time that occurs when the C-RAN structure is applied and efficiently performing scheduling of radio resources.

In a first example aspect, a remote node includes: a scheduler configured to perform scheduling for a first radio resource among radio resources available for radio communication, the first radio resource being a radio resource designated in advance by a center node; and a communication unit configured to perform radio communication with a communication terminal by using the first radio resource or a second radio resource among the radio resources available for radio communication, the second radio resource being a radio resource for which scheduling has been performed by the center node.

In a second example aspect, a center node includes: a scheduler configured to designate a first radio resource among radio resources available for radio communication in a remote node, the first radio resource being a radio resource for which the remote node can autonomously perform scheduling; and a communication unit configured to transmit information about the first radio resource to the remote node that performs radio communication with a communication terminal by using the first radio resource.

In a third example aspect, a communication system includes: a center node configured to designate a first radio resource among radio resources available for radio communication in a remote node and transmit information about the first radio resource to the remote node that performs radio communication with a first communication terminal by using the first radio resource, the first radio resource being a radio resource for which the remote node can autonomously perform scheduling; and the remote node configured to perform scheduling for the first radio resource among the radio resources available for radio communication and perform radio communication with a communication terminal by using the first radio resource or a second radio resource among the radio resources available for radio communication, the first radio resource being a radio resource designated in advance by the center node, the second radio resource being a radio resource for which scheduling has been performed by the center node.

In a fourth example aspect, a communication terminal includes a communication unit configured to perform radio communication with a remote node by using a first radio resource among radio resources available for radio communication in the remote node, the first radio resource being a radio resource of which a center node has notified the remote node in advance as a radio resource that the remote node can autonomously allocate to the communication terminal.

In a fifth example aspect, a communication method includes: performing scheduling for a first radio resource among radio resources available for radio communication, the first radio resource being a radio resource designated in advance by a center node; and performing radio communication with a communication terminal by using the first radio resource or a second radio resource among the radio resources available for radio communication, the second radio resource being a radio resource for which scheduling has been performed by the center node.

In a sixth example aspect, a program causes a computer to execute: performing scheduling for a first radio resource among radio resources available for radio communication, the first radio resource being a radio resource designated in advance by a center node; and performing radio communication with a communication terminal by using the first radio resource or a second radio resource among the radio resources available for radio communication, the second radio resource being a radio resource for which scheduling has been performed by the center node.

According to the present disclosure, it is possible to provide a remote node, a center node, a communication system, a communication method, and a program capable of reducing the effect of an increase in the processing time that occurs when the C-RAN structure is applied and efficiently performing scheduling of radio resources.

The above and other objects, features and advantages of the present invention will become more fully understood from the detailed description given hereinbelow and the accompanying drawings which are given by way of illustration only, and thus are not to be considered as limiting the present invention.

EXEMPLARY EMBODIMENT (First Embodiment)

Figure 1:
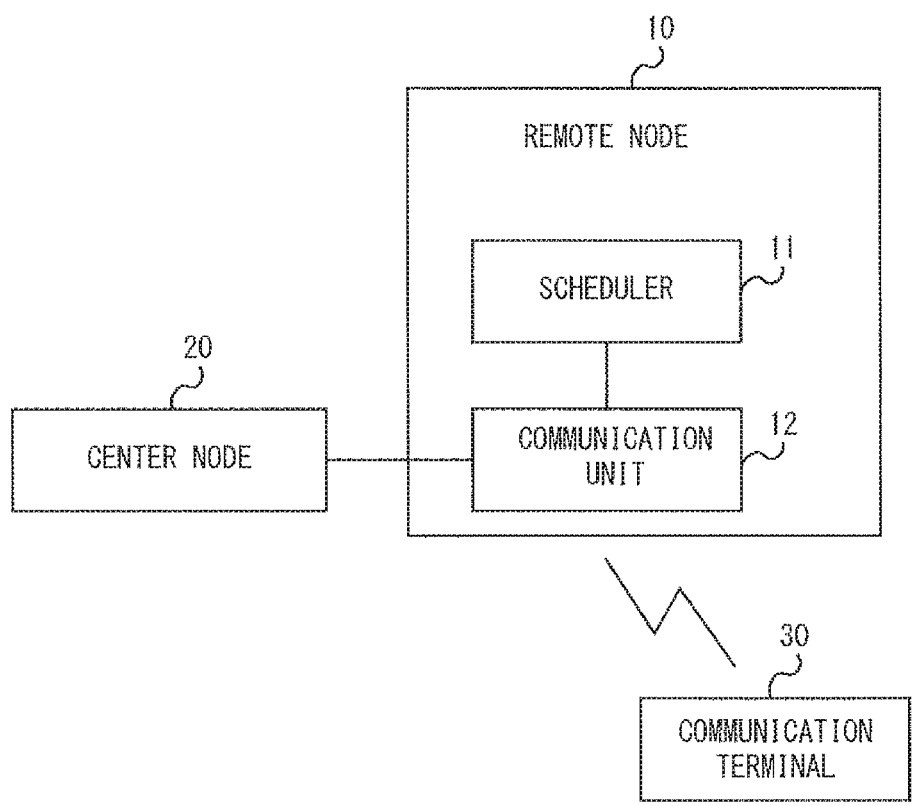
FIG. 1 is a configuration diagram of a communication system according to a first embodiment.

Embodiments according to the present disclosure are explained hereinafter with reference to the drawings. A configuration example of a communication system according to a first embodiment of the present disclosure is explained with reference to FIG. 1. The communication system shown in FIG. 1 includes a remote node 10, a center node 20, and a communication terminal 30.

The remote node 10 performs a Layer-1 process in radio communication. The Layer 1 may be referred to as, for example, a physical layer. Further, the remote node 10 may be referred to as a Distributed Unit or Lower layers of NR BS. Alternatively, the remote node 10 may be referred to as an RRU (Remote Radio Unit). The remote node 10 may be a computer device that operates by having its processor execute a program stored in a memory.

The center node 20 performs a Layer-2 process in radio communication. The Layer-2 process is a process for controlling the physical layer. The center node 20 may be referred to as a Central Unit or an Upper Layer of NR BS. Alternatively, the center node 20 may be referred to as a BBU (Base Band Unit). The center node 20 may be a computer device that operates by having its processor execute a program stored in a memory.

The communication terminal 30 is a device that performs radio communication with the remote node 10. The communication terminal 30 may be, for example, a mobile phone terminal, a smartphone terminal, or a computer device having a communication function. Alternatively, the communication terminal 30 may be an IoT (Internet of Things) terminal, an M2M (Machine to Machine) terminal, or an MTC (Machine Type Communication) terminal. The communication terminal 30 may be a computer device that operates by having its processor execute a program stored in a memory.

Next, a configuration example of the remote node 10 is explained. The remote node 10 includes a scheduler 11 and a communication unit 12. Components constituting the remote node 10, such as the scheduler 11 and the communication unit 12, may be software or modules by which processes are performed by having a processor execute a program stored in a memory. Alternatively, components constituting the remote node 10 may be hardware such as circuits or semiconductor chips.

The scheduler 11 performs scheduling (i.e., makes out a schedule) for a radio resource that is designated in advance by the center node 20 among radio resources available for radio communication. The radio communication is communication performed between the remote node 10 and the communication terminal 30. For example, the radio communication may be communication in accordance with LTE (Long Term Evolution) specified in 3GPP (3rd Generation Partnership Project) or communication in accordance with a new radio communication method succeeding the LTE.

The radio resource that is designated in advance by the center node 20 is, for example, a radio resource that is designated in the center node 20 before the radio communication between the remote node 10 and the communication terminal 30 is performed. The remote node 10 may acquire information about the radio resource, which is designated in the center node 20, before the radio communication with the communication terminal 30 is performed. Alternatively, the remote node 10 may acquire information about the radio resource, which is designated in the center node 20, during the radio communication with the communication terminal 30. In this case, the remote node 10 performs the scheduling for the designated radio resource after acquiring the information about the radio resource designated in the center node 20.

The scheduling is a process in which the scheduler 11 allocates a radio resource to the communication terminal 30. When the scheduler 11 allocates a radio resource to the communication terminal 30, the remote node 10 and the communication terminal 30 perform radio communication by using the radio resource allocated to the communication terminal 30. The scheduler 11 may allocate radio resources designated in the center node 20 to two or more communication terminals.

The communication unit 12 performs radio communication with the communication terminal 30 by using either a radio resource for which scheduling is performed by the scheduler 11 or a radio resource for which scheduling is performed by the center node 20 among the radio resources available for radio communication. The radio resources available to the remote node 10 include a radio resource for which scheduling is performed by the scheduler 11 and a radio resource for which scheduling is performed in the center node 20.

As explained above, the remote node 10 can autonomously perform scheduling for the radio resource designated in the center node 20 among the radio resources available for radio communication. Therefore, the remote node 10 does not need to inquire of the center node 20 about a scheduling result for the radio resource designated in the center node 20. Consequently, it is possible to reduce the number of signal transmissions between the remote node 10 and the center node 20 when the remote node 10 performs radio communication by using the radio resource designated in the center node 20. Therefore, it is possible to prevent or reduce a processing delay which would otherwise be caused due to the signal transmission between the remote node 10 and the center node 20.

Further, the radio resources that the remote node 10 can use for radio communication are classified into radio resources for which the scheduler 11 performs scheduling and radio resources for which the center node 20 performs scheduling. That is, by dividing the radio resources into radio resources for which the scheduler 11 performs scheduling and radio resources for which the center node 20 performs scheduling and managing them in this divided state, the occurrence of any inconsistency between a scheduling result in the scheduler 11 and a scheduling result in the center node 20 is prevented.

(Second Embodiment)

Figure 2:
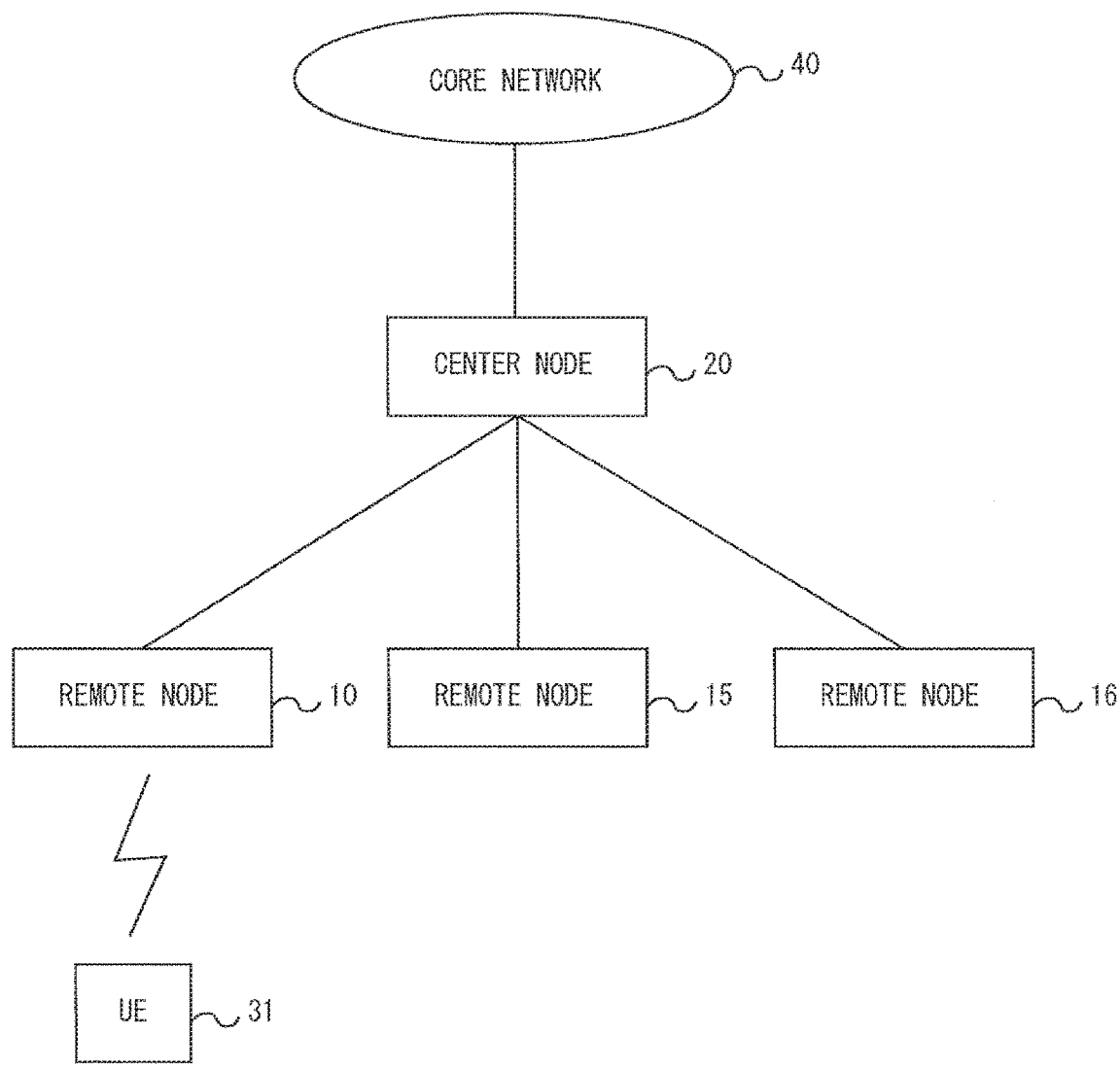
FIG. 2 is a configuration diagram of a communication system according to a second embodiment.

Next, a configuration example of a communication system according to a second embodiment of the present disclosure is explained with reference to FIG. 2. In the configuration of the communication system shown in FIG. 2, remote nodes 10, 15 and 16 connect to a center node 20. Further, in the configuration of the communication system shown in FIG. 2, the center node 20 connects to a core network 40. Although FIG. 2 shows a configuration in which three remote nodes connect to the center node 20, the number of remote nodes that connect to the center node 20 is not limited to three. Further, in the communication system shown in FIG. 2, a UE (User Equipment) 31 performs radio communication with the remote node 10. The UE 31 corresponds to the communication terminal 30 in FIG. 1. The remote nodes 10, 15 and 16 are disposed in places that are physically apart from the center node 20.

The remote nodes 10, 15 and 16 may connect to the center node 20 through, for example, an Ethernet (Registered Trademark). Each of the remote nodes 10, 15 and 16 may perform a process related to a physical (PHY) layer in radio communication and a process related to a part of the functions in a MAC layer. The part of the functions in the MAC layer may be, for example, an HARQ for performing resending control and scheduling for performing radio resource allocation control.

The core network 40 performs mobile control or bearer control for the UE 31 that performs radio communication with one of the remote nodes 10, 15 and 16. The term "UE" is used as a general term for communication terminals in the 3GPP.

The center node 20 performs scheduling of a radio resource for the UE 31 located in a communication area formed by the remote node 10. Further, the center node 20 performs scheduling of radio resources for a UE located in a communication area formed by the remote node 15 and for a UE located in a communication area formed by the remote node 16. The center node 20 may perform processes related to a MAC layer, an RLC (Radio Link Control) layer, and PDCP (Packet Data Convergence Protocol) layer.

Note that the center node 20 designates radio resources for which the remote nodes 10, 15 and 16 autonomously perform scheduling. Therefore, the center node 20 does not perform scheduling for radio resources that are designated as radio resources for which the remote node 10 and the like autonomously perform scheduling.

Scheduling performed by the center node 20 and the remote node 10 may be regarded as a function performed in the MAC layer and referred to as MAC scheduling.

Figure 3:
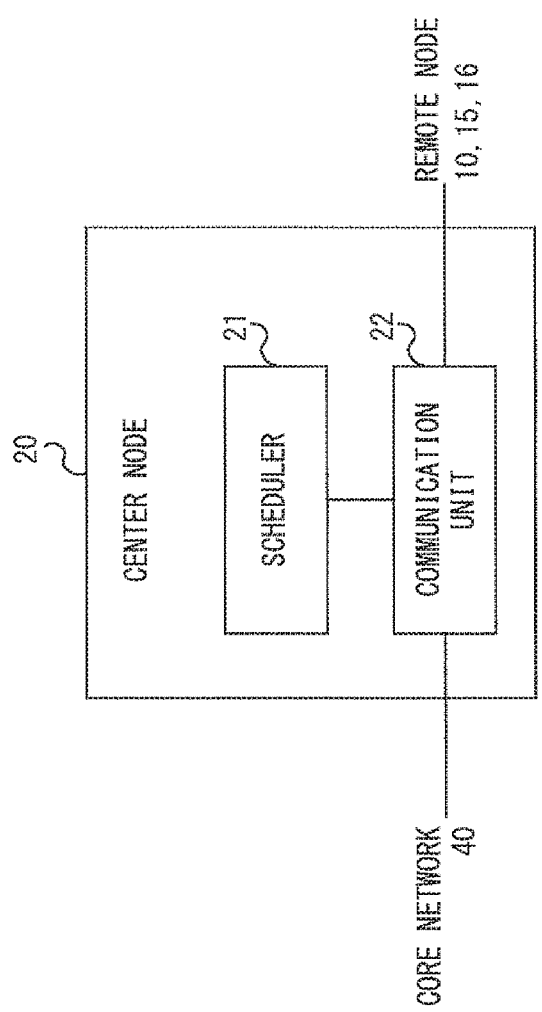
FIG. 3 is a configuration diagram of a center node according to the second embodiment.

Next, a configuration example of the center node 20 is explained with reference to FIG. 3. The center node 20 includes a scheduler 21 and a communication unit 22. Components constituting the center node 20, such as the scheduler 21 and the communication unit 22, may be software or modules by which processes are performed by having a processor execute a program(s) stored in a memory. Alternatively, components constituting the center node 20 may be hardware such as circuits or semiconductor chips.

The scheduler 21 designates, for example, a radio resource for which the remote node 10 can autonomously perform scheduling among radio resources available for radio communication in the remote node 10. Hereinafter, a radio resource for which a remote node can autonomously perform scheduling is referred to as an autonomously-set radio resource. The scheduler 21 also designates an autonomously-set radio resource for each of the remote nodes 15 and 16 in a manner similar to that for the remote node 10.

The communication unit 22 transmits information about the autonomously-set radio resource to the remote node 10 that performs radio communication with the UE 31 by using the autonomously-set radio resource. The radio resource is specified by using, for example, information on a time period (hereinafter referred to as "time period information") and information on a frequency band (hereinafter referred to as "frequency-band information"). The autonomously-set radio resource is specified by using, for example, time period information that the remote node 10 can autonomously set and frequency-band information that the remote node 10 can autonomously set. In other words, the autonomously-set radio resource is specified by using information on a time resource that the remote node 10 can autonomously set and information on a frequency resource that the remote node 10 can autonomously set.

Figure 4:
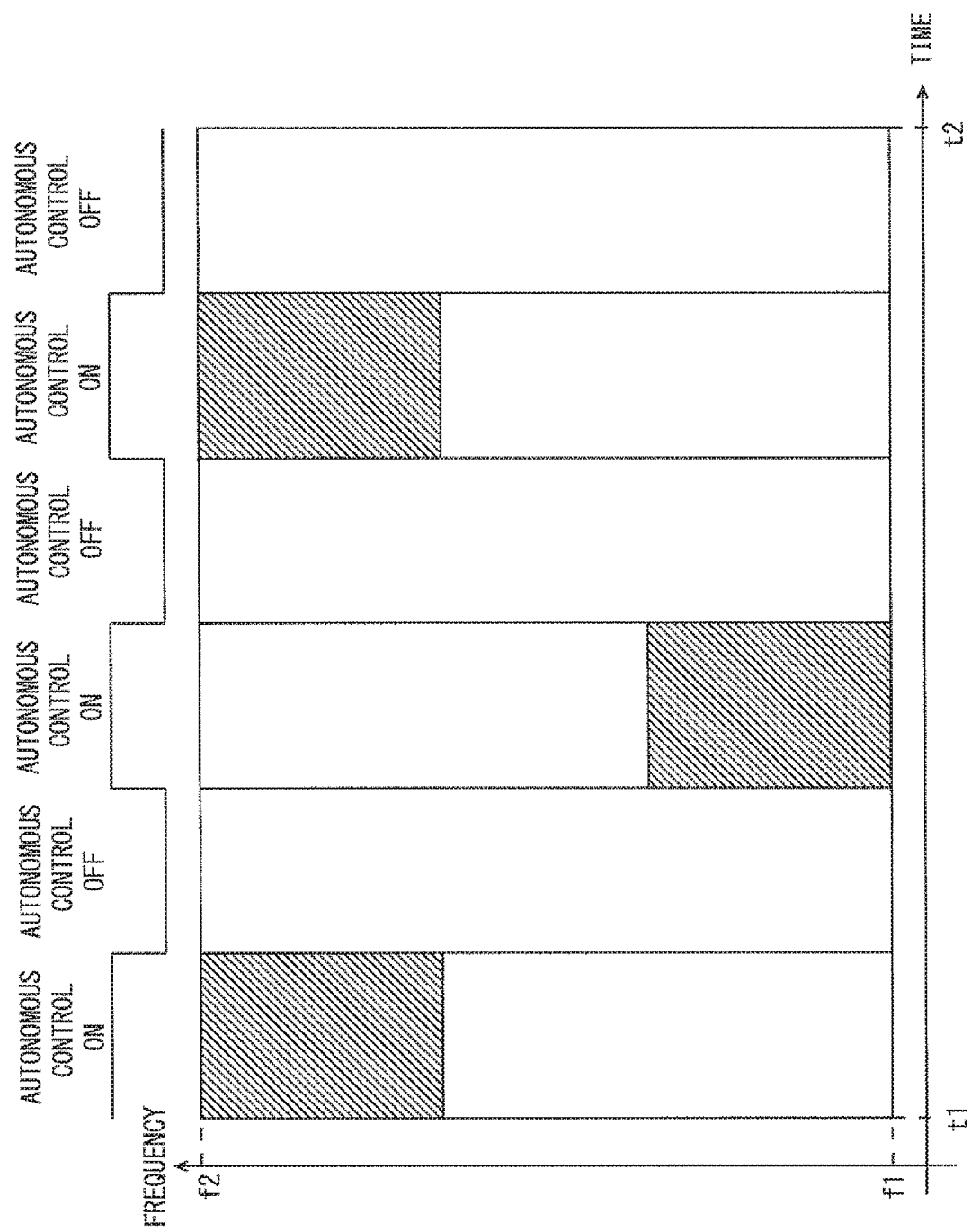
FIG. 4 is a diagram for explaining autonomously-set radio resources according to the second embodiment.

An autonomously-set radio resource designated by the scheduler 21 is explained with reference to FIG. 4. In FIG. 4, a vertical axis indicates frequencies of radio resources and a horizontal axis indicates time of the radio resources. An area between times t1 and t2 in FIG. 4 and between frequencies f1 and f2 represents radio resources that the UE 31 can use. Further, FIG. 4 shows periods in which autonomous control is in an On-state and periods in which the autonomous control is in an Off-state along the horizontal axis. The period in which autonomous control is in an On-state means a period in which the remote node 10 can autonomously perform scheduling of a radio resource and the period in which autonomous control is in an Off-state means a period in which the remote node 10 cannot autonomously perform scheduling of a radio resource.

Hatched areas in FIG. 4 indicate autonomously-set radio resources. An autonomously-set radio resource is set in a period in which the autonomous control is an On-state and in a specific frequency band. The autonomously-set radio resources shown in FIG. 4 are designated in accordance with a specific pattern. For example, the autonomously-set radio resources shown in FIG. 4 are designated in such a manner a high frequency band radio resource and a low frequency band radio resource are alternately repeated in a certain cycle. The pattern according to which autonomously-set radio resources are designated is not limited to the pattern shown in FIG. 4. Radio resources other than the autonomously-set radio resources shown in FIG. 4 are radio resources for which scheduling is performed in the center node 20.

The scheduler 21 may first specify a time resource in an autonomously-set radio resource by using information about a timing at which a period in which autonomous control is in an On-state or a period in which autonomous control is in an Off-state starts and a cycle in which the period in which autonomous control is in an On-state or the period in which autonomous control is in an Off-state occurs. Further, the scheduler 21 may specify a frequency resource in an autonomously-set radio resource by using a start frequency and an end frequency of the autonomously-set radio resource. Alternatively, the scheduler 21 may specify a frequency resource in an autonomously-set radio resource by using a start frequency of the autonomously-set radio resource and a width of a frequency band available to the UE 31.

Figure 5:
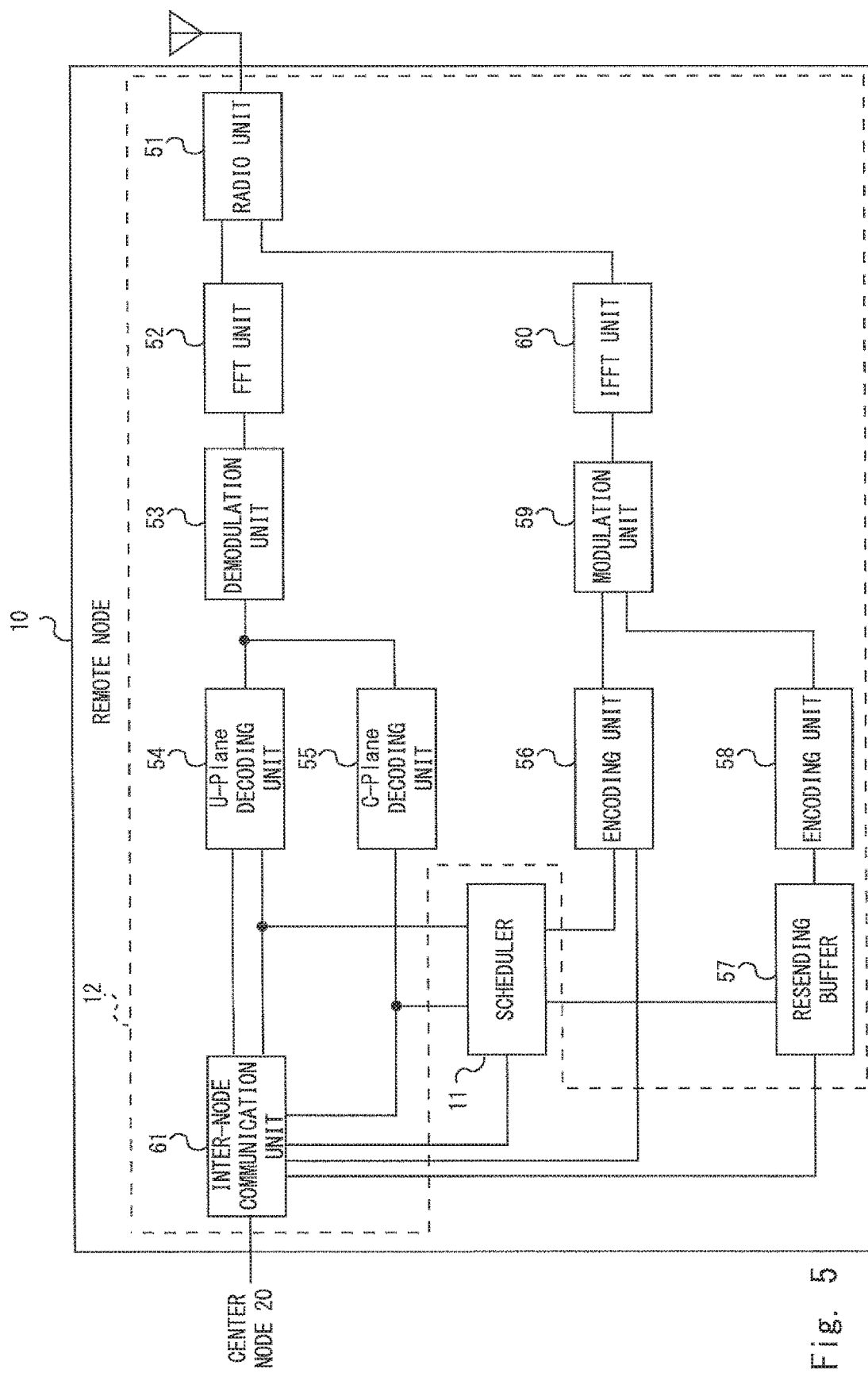
FIG. 5 is a configuration diagram of a remote node according to the second embodiment.

Next, a detailed configuration example of the remote node 10 according to the second embodiment of the present disclosure is explained with reference to FIG. 5. FIG. 5 shows the remote node 10 shown in FIG. 1 in a more detailed manner. The configuration of each of the remote nodes 15 and 16 is similar to that of the remote node 10 and therefore their explanations are omitted.

The communication unit 12 in the remote node 10 shown in FIG. 5 includes a radio unit 51, an FFT unit 52, a demodulation unit 53, a U-Plane decoding unit 54, a C-Plane decoding unit 55, an encoding unit 56, a resending buffer 57, an encoding unit 58, a modulation unit 59, an IFFT unit 60, and an inter-node communication unit 61. Components constituting the communication unit 12 may be software or modules by which processes are performed by having a processor execute a program stored in a memory. Alternatively, components constituting the communication unit 12 may be hardware such as circuits or semiconductor chips.

The radio unit 51 down-converts an Uplink reception signal in an RF (Radio Frequency) band transmitted from the UE 31 into a signal in a baseband. A signal in the RF band may be referred to as a radio frequency signal or a high frequency signal. The radio unit 51 outputs the Uplink reception signal in the baseband to the FFT (Fast Fourier Transform) unit 52. Further, the radio unit 51 convers a Downlink transmission signal in the baseband that is transmitted to the UE 31 into a signal in the RF band.

The FFT unit 52 converts the Uplink reception signal in a time domain into an Uplink reception signal in a frequency domain. The FFT unit 52 outputs the Uplink reception signal in the frequency domain to the demodulation unit 53. Each UE uses a different frequency resource for an Uplink reception signal. The demodulation unit 53 makes a correction and the like to the Uplink reception signal, for which a different radio resource is used for each UE, to eliminate a distortion caused by the radio transmission path. The demodulation unit 53 outputs U-Plane (User-Plane) data, i.e., user data, of the Uplink reception signal, for which the correction and the like has been made to eliminate the distortion caused by the radio transmission path, to the U-Plane decoding unit 54. Further, the demodulation unit 53 outputs C-Plane data, i.e., a control signal, of the Uplink reception signal, for which the correction and the like has been made to eliminate the distortion caused by the radio transmission path, to the C-Plane decoding unit 55.

The U-Plane data is, for example, user data transmitted form the UE 31. The C-Plane data may be, for example, a delivery confirmation signal indicating whether or not the UE 31 has correctly received the user data, which the remote node 10 has transmitted to the UE 31. The delivery confirmation signal is transmitted from the UE 31 to the remote node 10. The delivery confirmation signal may be, for example, an ACK signal or an NACK signal. The ACK signal indicates that the UE 31 has correctly received the user data, while the NACK signal indicates that the UE 31 was not able to correctly receive the user data. To put it differently, the fact that the UE 31 correctly received the user data may be expressed that the UE 31 was able to correctly decode the user data.

The U-Plane decoding unit 54 performs error correction decoding for the U-Plane data. The U-Plane decoding unit 54 outputs the U-Plane data to the inter-node communication unit 61. Further, the U-Plane decoding unit 54 outputs a result of a CRC (Cyclic Redundancy Check) that is performed in the error correction decoding to the inter-node communication unit 61 and the scheduler 11. When the U-Plane decoding unit 54 has succeeded in the error correction decoding, it outputs a signal "CRC-OK" to the inter-node communication unit 61 and the scheduler 11. When the U-Plane decoding unit 54 has failed in the error correction decoding, it outputs a signal "CRC-NG" to the inter-node communication unit 61 and the scheduler 11.

The C-Plane decoding unit 55 performs error correction decoding for the C-Plane data. The C-Plane decoding unit 55 outputs the C-Plane data, which is an ACK signal or an NACK signal, to the inter-node communication unit 61 and the scheduler 11.

The scheduler 11 holds information about an autonomously-set radio resource that is transmitted in advance from the center node 20. When the scheduler 11 receives the CRC-NG from the U-Plane decoding unit 54, it performs scheduling of an autonomously-set radio resource and allocates the autonomously-set radio resource to the UE 31 in order to allocate the radio resource that is used when the UE 31 retransmits the user data. The scheduler 11 outputs a DCI (Downlink Control Information) control signal indicating the radio resource, which is used when the UE 31 retransmits the user data, to the encoding unit 56.

The encoding unit 56 performs error correction encoding for the DCI control signal. The encoding unit 56 outputs the error-correction-encoded DCI control signal to the modulation unit 59. The modulation unit 59 performs a modulation process for the DCI control signal. The modulation method performed by the modulation unit 59 may be ASK (Amplitude Shift Keying), QAM (Quadrature Amplitude Modulation), or the like. Alternatively, other modulation methods may be used. The modulation unit 59 stores the DCI control signal, for which the modulation process has been performed, into a physical channel and outputs the physical channel to an IFFT (Inverse FFT) unit 60.

The IFFT unit 60 converts the physical channel mapped onto a frequency domain into a physical channel expressed by a time domain. The physical channel is a Downlink transmission signal. The IFFT unit 60 outputs the Downlink transmission signal to the radio unit 51.

When the scheduler 11 receives an NACK signal from the C-Plane decoding unit 55, it makes the remote node 10 retransmit the user data to the UE 31. The scheduler 11 performs scheduling of an autonomously-set radio resource and allocates the autonomously-set radio resource to the UE 31 in order to allocate the radio resource that is used when the user data is retransmitted. The scheduler 11 outputs a DCI control signal indicating the radio resource, which is used when the user data is retransmitted from the remote node 10 to the UE 31, to the encoding unit 56.

The encoding unit 56 performs error correction encoding for the DCI control signal. The encoding unit 56 outputs the error-correction-encoded DCI control signal to the modulation unit 59. The modulation unit 59 performs a modulation process for the DCI control signal. The modulation unit 59 stores the DCI control signal, for which the modulation process has been performed, into a physical channel and outputs the physical channel to the IFFT unit 60.

The IFFT unit 60 converts the physical channel mapped onto a frequency domain into a physical channel expressed by a time domain. The physical channel is a Downlink transmission signal. The IFFT unit 60 outputs the Downlink transmission signal to the radio unit 51.

Further, the scheduler 11 outputs a retransmission instruction signal indicating that the user data should be retransmitted form the remote node 10 to the UE 31 to the resending buffer 57. Upon receiving the retransmission instruction signal, the resending buffer 57 sets the user data to be retransmitted in a radio resource that is set in the retransmission instruction signal. The resending buffer 57 outputs the user data stored therein to the encoding unit 58.

The encoding unit 58 performs error correction encoding for the user data to be retransmitted. The encoding unit 58 outputs the error-correction-encoded user data to the modulation unit 59. The modulation unit 59 performs a modulation process for the user data. The modulation unit 59 stores the user data, for which the modulation process has been performed, into a physical channel and outputs the physical channel to the IFFT unit 60.

The IFFT unit 60 converts the physical channel mapped onto a frequency domain into a physical channel in a time domain. The physical channel in the time domain is a Downlink transmission signal. The IFFT unit 60 outputs the Downlink transmission signal to the radio unit 51.

Further, the inter-node communication unit 61 receives a DCI control signal in which information about a radio resource that is allocated to the UE 31 or the like as a result of scheduling for a radio resource other than the autonomously-set radio resource performed by the center node 20 is set from the center node 20. Further, the inter-node communication unit 61 receives user data that is transmitted to the UE 31 or the like by using the radio resource other than the autonomously-set radio resource from the center node 20.

The inter-node communication unit 61 outputs a DCI control signal in which information about a radio resource that is allocated to the UE 31 or the like is set to the encoding unit 56. Further, the inter-node communication unit 61 outputs the user data received from the center node 20 to the resending buffer 57.

The encoding unit 56 performs error correction encoding for the DCI control signal. The encoding unit 56 outputs the error-correction-encoded DCI control signal to the modulation unit 59. The modulation unit 59 performs a modulation process for the DCI control signal. The modulation unit 59 stores the DCI control signal, for which the modulation process has been performed, into a physical channel and outputs the physical channel to the IFFT unit 60.

The resending buffer 57 outputs the user data received from the inter-node communication unit 61 to the encoding unit 58. The encoding unit 58 performs error correction encoding for the user data received from the resending buffer 57. The encoding unit 58 outputs the error-correction-encoded user data to the modulation unit 59. The modulation unit 59 performs a modulation process for the user data. The modulation unit 59 stores the user data, for which the modulation process has been performed, into a physical channel and outputs the physical channel to the IFFT unit 60.

Next, scheduling of an autonomously-set radio resource performed by the scheduler 11 is explained with reference to FIG. 6. The scheduler 11 has information about an autonomously-set radio resource that is designated in advance by the center node 20 as shown in FIG. 4. The scheduler 11 allocates the autonomously-set radio resource shown in FIG. 4 to a UE that performs retransmission or a UE that receives retransmission data transmitted by the remote node 10.

Figure 6:
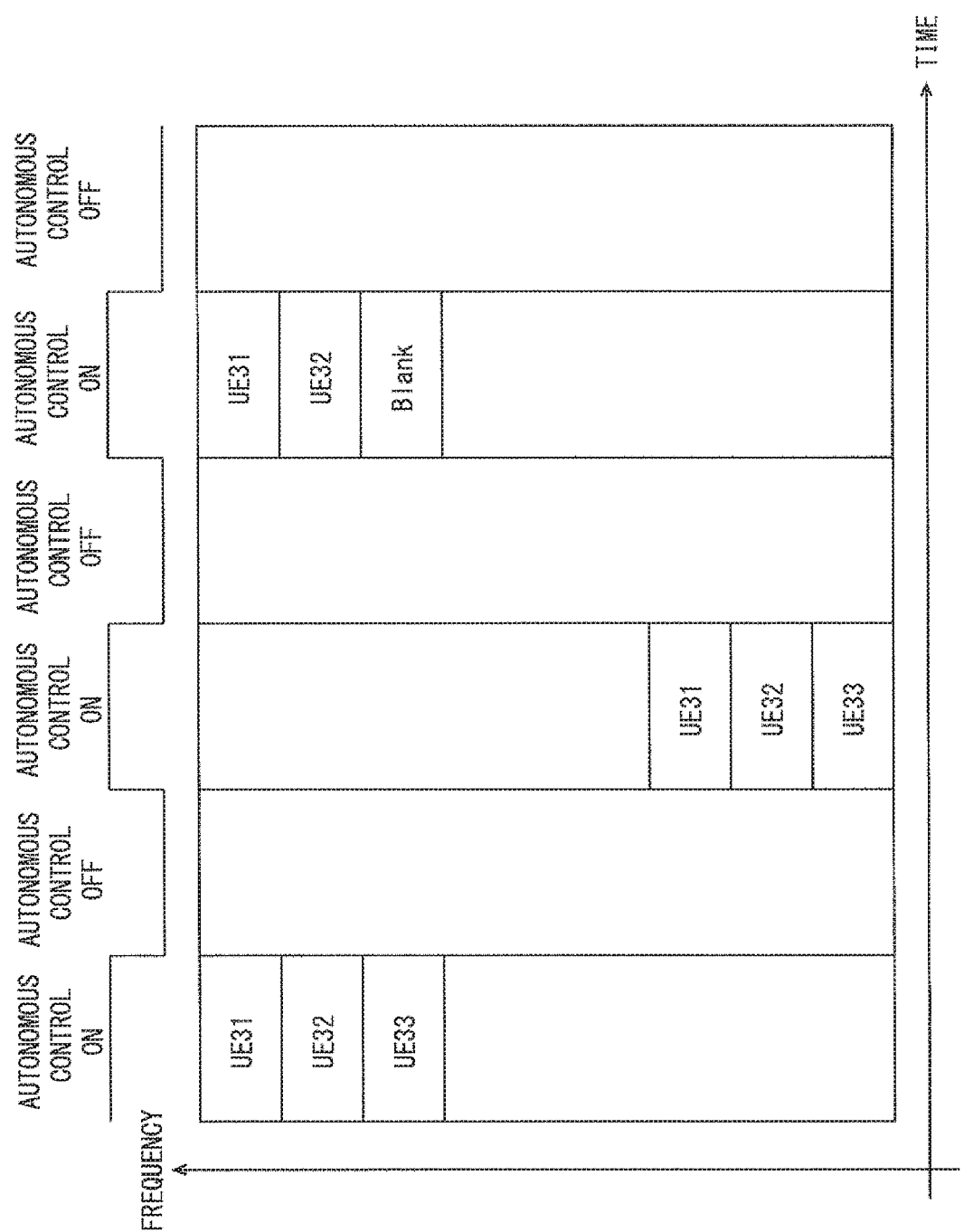
FIG. 6 is a diagram for explaining autonomously-set radio resources according to the second embodiment.

FIG. 6 shows that autonomously-set radio resources are allocated to UEs 31, 32 and 33 in periods in which autonomous control becomes an On-state for the first time and for the second time, respectively. Further, FIG. 6 shows that autonomously-set radio resources are allocated to the UEs 31 and 32 in a period in which the autonomous control becomes an On-state for the third time. In the period in which the autonomous control becomes an On-state for the third time, an autonomously-set radio resource that is not allocated to any of the UEs is indicated by a term "Blank".

Figure 7:
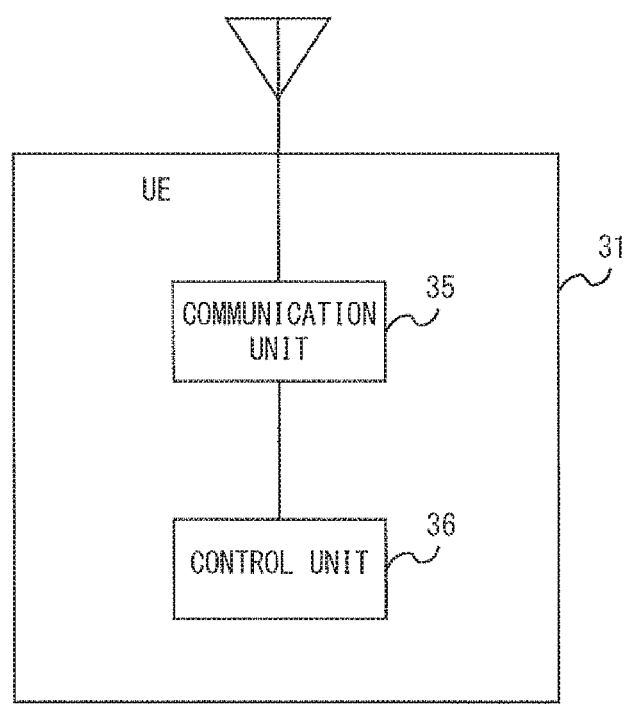
FIG. 7 is a configuration diagram of a UE according to the second embodiment.

Next, a configuration example of the UE 31 according to the second embodiment is explained with reference to FIG. 7. The UE 31 includes a communication unit 35 and a control unit 36. Components of the UE 31 such as the communication unit 35 and the control unit 36 may be software or modules by which processes are performed by having a processor execute a program stored in a memory. Alternatively, components constituting the UE 31 may be hardware such as circuits or semiconductor chips.

The communication unit 35 performs radio communication with the remote node 10 by using an autonomously-set radio resource for which the remote node 10 has performed scheduling. Further, the communication unit 35 may perform radio communication with the remote node 10 by using a radio resource for which the center node 20 has performed scheduling.

The control unit 36 performs a demodulation process and the like for data that is received by using an autonomously-set radio resource for which the remote node 10 has performed scheduling or a radio resource for which the center node 20 has performed scheduling. Further, the control unit 36 performs a modulation process and the like for data that is transmitted by using the autonomously-set radio resource for which the remote node 10 has performed scheduling or the radio resource for which the center node 20 has performed scheduling.

Figure 8:
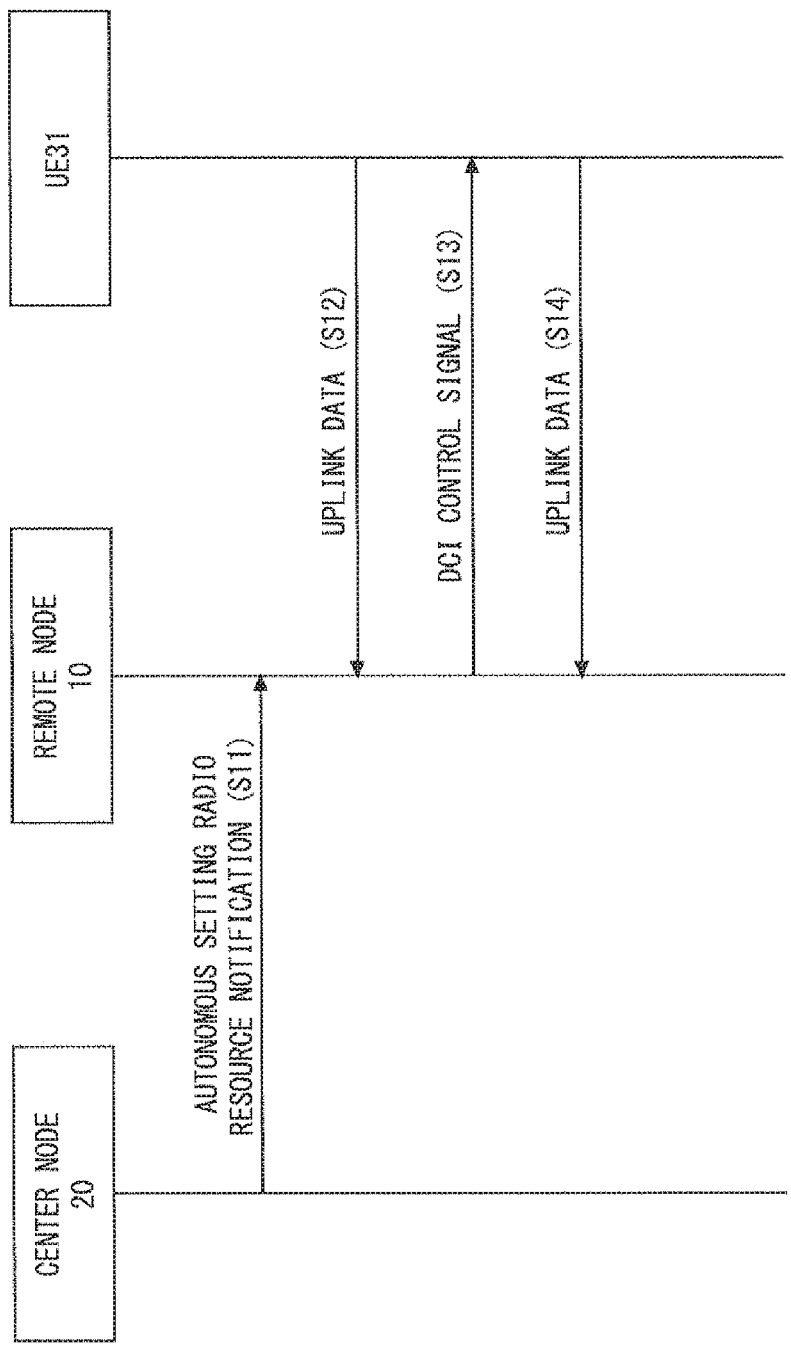
FIG. 8 is a diagram showing a flow of an uplink data communication process according to the second embodiment.

Next, a flow of an uplink data communication process according to the second embodiment of the present disclosure is explained with reference to FIG. 8. Firstly, the center node 20 transmits information about an autonomously-set radio resource to the remote node 10 (S11). Specifically, the center node 20 transmits information specifying a period and a frequency band for which the remote node 10 can autonomously perform scheduling as shown in FIG. 4 to the remote node 10.

Next, the UE 31 transmits uplink data to the remote node 10 (S12). It is assumed that the radio resource that the UE 31 uses for the transmission of the uplink data is a radio resource that is allocated to the UE 31 as a result of scheduling performed in the center node 20. Here, the remote node 10 fails in the decoding of the uplink data and hence it determines that the uplink data needs to be retransmitted from the UE 31 to the remote node 10.

Next, the remote node 10 transmits a DCI control signal to the UE 31 (S13). By doing so, the remote node 10 urges (i.e., requests) the UE 31 to retransmit the uplink data. In the DCI control signal transmitted in the step S13, information about a radio resource that has been allocated to the UE 31 as a result of scheduling performed for an autonomously-set radio resource is set.

Next, the UE 31 retransmits the uplink data, which was transmitted in the step S12, by using the radio resource designated in the DCI control signal received in the step S13 (S14).

Figure 9:
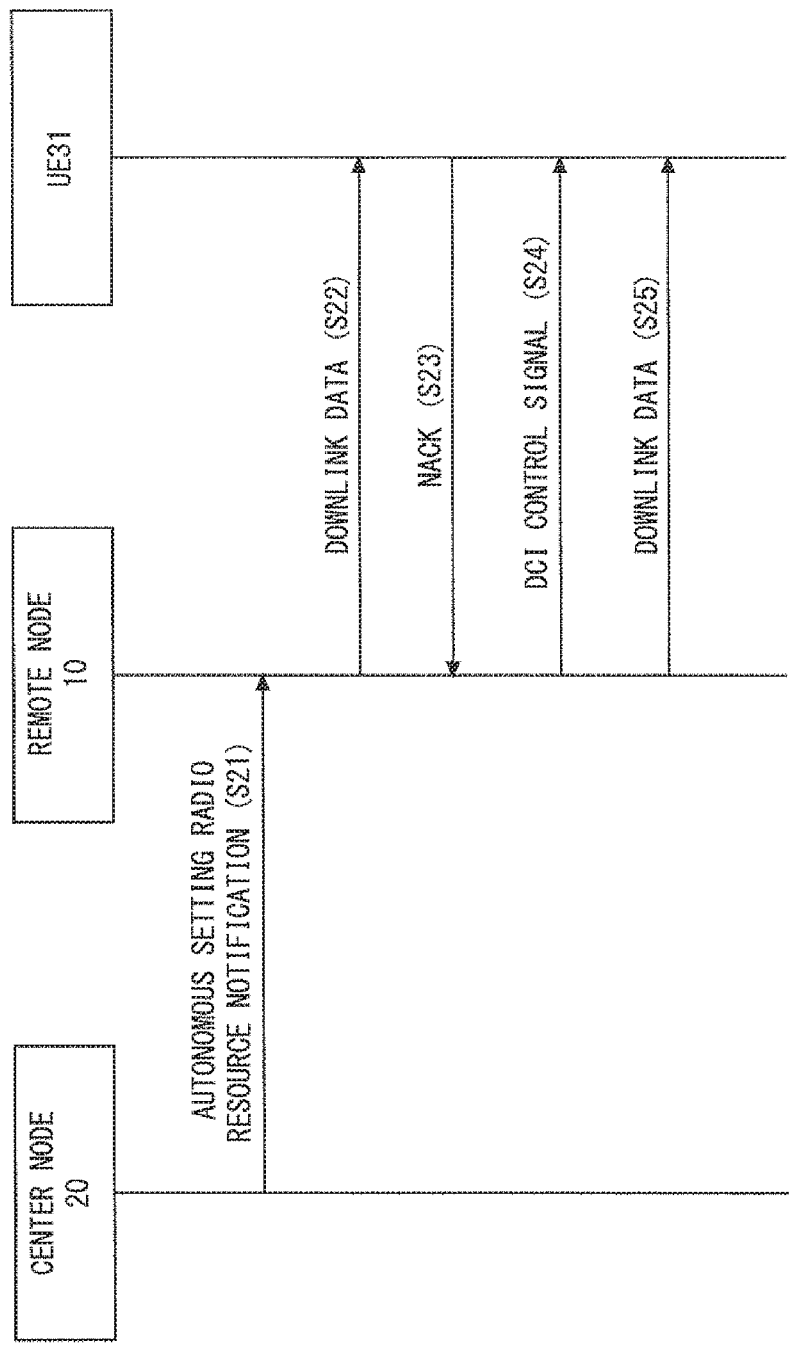
FIG. 9 is a diagram showing a flow of a downlink data communication process according to the second embodiment.

Next, a flow of a downlink data communication process according to the second embodiment of the present disclosure is explained with reference to FIG. 9. Firstly, the center node 20 transmits information about an autonomously-set radio resource to the remote node 10 (S21). Specifically, the center node 20 transmits information specifying a period and a frequency band for which the remote node 10 can autonomously perform scheduling as shown in FIG. 4 to the remote node 10.

Next, the remote node 10 transmits downlink data to the UE 31 (S22). It is assumed that the radio resource that the remote node 10 uses for the transmission of the downlink data is a radio resource that is allocated to the UE 31 as a result of scheduling performed in the center node 20.

Next, the UE 31 fails in the decoding of the downlink data and hence transmits an NACK signal to the remote node 10 (S23).

Next, the remote node 10 transmits a DCI control signal to the UE 31 (S24). In the DCI control signal in the step S24, information about a radio resource that has been allocated to the UE 31 as a result of scheduling performed for an autonomously-set radio resource is set. Further, the remote node 10 notifies the UE 31 that the downlink data should be retransmitted by using this DCI control signal.

Next, the remote node 10 retransmits the downlink data, which was transmitted in the step S22, by using the radio resource designated in the DCI control signal transmitted in the step S24 (S25).

Figure 10:
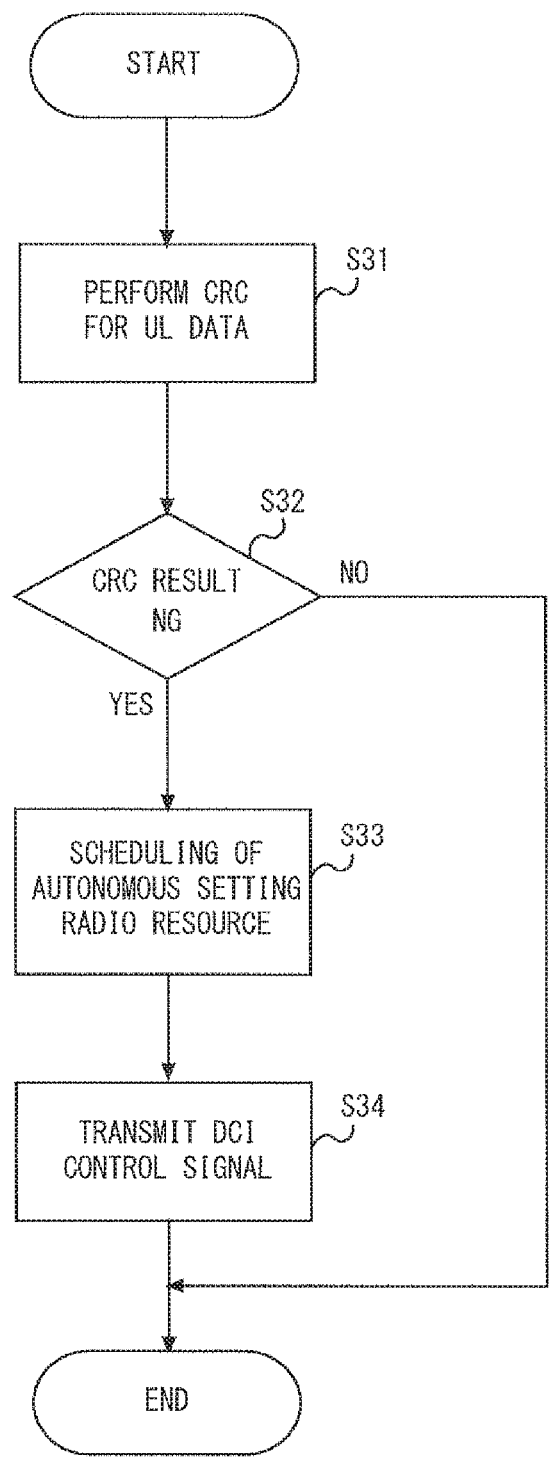
FIG. 10 is a diagram showing a process flow for retransmission of uplink data in a remote node according to the second embodiment.

Next, a process flow in the remote node 10 for retransmission of uplink data is explained with reference to FIG. 10. Firstly, the U-Plane decoding unit 54 of the remote node 10 performs a CRC for uplink data transmitted from the UE 31 (S31). Next, the scheduler 11 determines whether or not a result of the CRC performed in the U-Plane decoding unit 54 is a CRC-NG (S32).

When the scheduler 11 determines that the result is a CRC-NG, it performs scheduling for an autonomously-set radio resource that is notified in advance from the center node 20 (i.e., an autonomously-set radio resource information of which is sent in advance from the center node 20) and allocates a radio resource to the UE 31 (S33).

Next, the scheduler 11 transmits a DCI control signal to the UE 31 through the communication unit 12 (S34). In the DCI control signal, information about a radio resource that has been allocated to the UE 31 as a result of scheduling performed by the scheduler 11 is set. Upon receiving the DCI control signal, the UE 31 retransmits the uplink data by using the radio resource designated in the DCI control signal. When the scheduler 11 determines that the result of the CRC performed in the U-Plane decoding unit 54 is a CRC-OK in the step S32, it does not perform scheduling for an autonomously-set radio resource.

Figure 11:
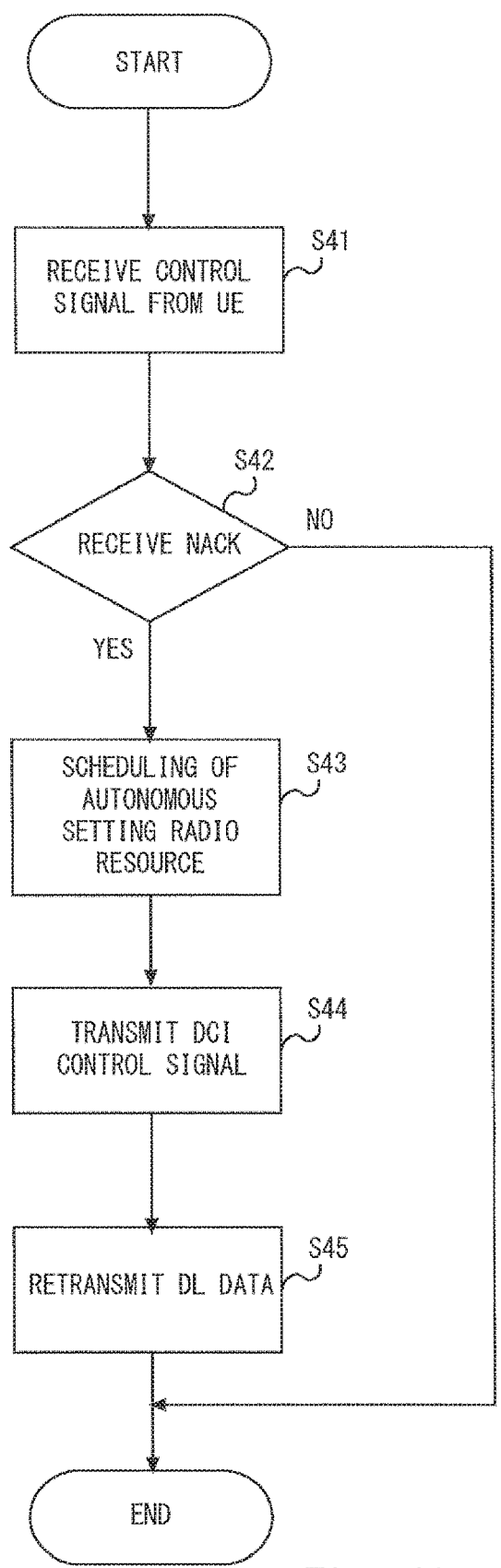
FIG. 11 is a diagram showing a process flow for retransmission of downlink data in a remote node according to the second embodiment.

Next, a process flow in the remote node 10 for retransmission of downlink data is explained with reference to FIG. 11. Firstly, the C-Plane decoding unit 55 of the remote node 10 receives a control signal transmitted from the UE 31 (S41). Next, the scheduler 11 determines whether or not the control signal received by the C-Plane decoding unit 55 is an NACK signal (S42).

When the scheduler 11 determines that the control signal is an NACK signal, it performs scheduling for an autonomously-set radio resource that is notified in advance from the center node 20 and allocates a radio resource to the UE 31 (S43).

Next, the scheduler 11 transmits a DCI control signal to the UE 31 through the communication unit 12 (S44). In the DCI control signal, information about a radio resource that has been allocated to the UE 31 as a result of scheduling performed by the scheduler 11 is set.

Next, the communication unit 12 retransmits the downlink data stored in the resending buffer 57 to the UE 31 by using the radio resource that has been allocated to the UE 31 as a result of the scheduling performed by the scheduler 11 (S45). When the scheduler 11 determines that the control signal is an ACK in the step S42, it does not perform scheduling for an autonomously-set radio resource.

As explained above, the center node 20 according to the second embodiment can transmit information about a predefined autonomously-set radio resource to the remote node 10. Further, the remote node 10 can perform scheduling for an autonomously-set radio resource and thereby allocate a radio resource to the UE 31 that retransmits uplink data. In this way, it is possible, when the remote node 10 fails in the decoding of uplink data transmitted from the UE 31, to prevent the remote node 10 from inquiring of the center node 20 about a radio resource allocated to the UE 31. That is, signal transmission between the remote node 10 and the center node 20 which would otherwise be performed when the remote node 10 notifies the UE 31 of the radio resource used for the retransmission of the uplink data is prevented. As a result, it is possible to reduce the delay caused in the retransmission of uplink data compared to the case where signal transmission is performed between the remote node 10 and the center node 20 when the remote node 10 notifies the UE 31 of the radio resource used for the retransmission of the uplink data.

Further, the remote node 10 can perform scheduling for an autonomously-set radio resource and thereby allocate a radio resource used for retransmission of downlink data to the UE 31 which is the destination of the retransmitted downlink data. In this way, it is possible, when the remote node 10 receives an NACK signal for transmitted downlink data, to prevent the remote node 10 from inquiring of the center node 20 about a radio resource used for the retransmission of the downlink data to the UE 31. That is, signal transmission between the remote node 10 and the center node 20 which would otherwise be performed when the remote node 10 retransmits the downlink data to the UE 31 is prevented. As a result, it is possible to reduce the delay caused in the retransmission of downlink data compared to the case where signal transmission is performed between the remote node 10 and the center node 20 when the remote node 10 retransmits the downlink data to the UE 31.

(Third Embodiment)

Figure 12:
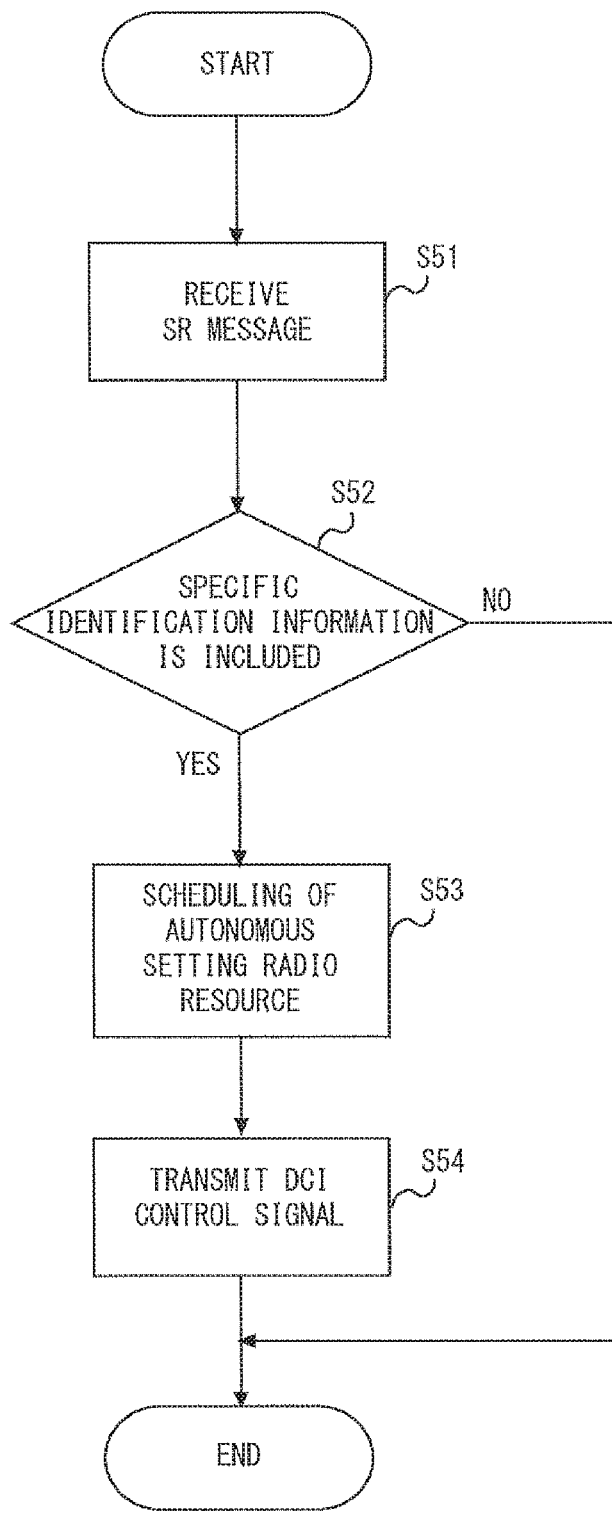
FIG. 12 is a diagram showing a process flow for retransmission of uplink data in a remote node according to a third embodiment.

Next, a process flow in the remote node 10 for transmission of uplink data according to a third embodiment is explained with reference to FIG. 12. Firstly, the C-Plane decoding unit 55 of the remote node 10 receives an SR (Scheduling Request) message from the UE 31 as a control signal. When uplink data occurs (i.e., when there is uplink data to be transmitted), the UE 31 transmits an SR message to the remote node 10 in order to inquire of the remote node 10 about a radio resource used for the transmission of the uplink data. The SR message includes identification information of the UE 31. The identification information of the UE 31 may be an IMSI (International Mobile Subscriber Identity), a telephone number assigned to the UE 31, information for identifying a service used by the UE 31, information on a contract for the UE 31, or the like.

Next, the scheduler 11 determines whether or not the SR message includes specific identification information (S52). The specific identification information may be information that is notified in advance from the core network 40 as identification information of a UE that accepts a low-delay service. For example, the specific identification information may be an IMSI or a telephone number indicating a UE that accepts a low-delay service notified from the core network 40. Alternatively, the specific identification information may be other information for identifying a UE that accepts a low-delay service from the core network 40.

The specific identification information that is notified in advance from the core network 40 may be stored in, for example, a memory included in the remote node 10.

When the identification information of the UE 31 included in the SR message matches the specific identification information held in the remote node 10, the scheduler 11 performs scheduling for an autonomously-set radio resource that is notified in advance from the center node 20 and allocates a radio resource to the UE 31 (S53).

Next, the scheduler 11 transmits a DCI control signal to the UE 31 through the communication unit 12 (S54). In the DCI control signal, information about a radio resource that has been allocated to the UE 31 as a result of scheduling performed by the scheduler 11 is set. Upon receiving the DCI control signal, the UE 31 transmits uplink data by using the radio resource designated in the DCI control signal.

When the scheduler 11 determines that the specific identification information is not included in the SR message in the step S52, it does not perform scheduling for an autonomously-set radio resource. That is, when the specific identification information is not included in the SR message, the center node 20 performs scheduling for a radio resource other than the autonomously-set radio resource and allocates the radio resource to the UE that has transmitted the SR message.

As explained above, the remote node 10 according to the third embodiment can perform scheduling for an autonomously-set radio resource and allocate a radio resource to a specific UE 31 that transmits uplink data. In this way, it is possible to prevent the remote node 10 from inquiring of the center node 20 about the radio resource allocated to the specific UE 31. As a result, the UE 31 can transmit uplink data with a delay time shorter than that of other UEs.

Further, for a radio resource used for transmission of uplink data in a specific UE or in a specific service, it is possible to reduce the load for the scheduling performed in the center node 20 by having the remote node 10 perform scheduling.

Further, for downlink data, the remote node 10 may also perform scheduling for a radio resource used in a specific UE or in a specific service. As a result, it is possible to reduce the load for scheduling performed in the center node 20.

(Fourth Embodiment)

Next, a flow of an autonomously-set radio resource update process that is performed when uplink data is transmitted according to a fourth embodiment is explained with reference to FIG. 13. Steps S61 to S64 in FIG. 13 are similar to the steps S11 to S14 in FIG. 8 and therefore their detailed explanations are omitted.

After the remote node 10 performs scheduling for an autonomously-set radio resource and transmits a DCI control signal in which information about a radio resource allocated to the UE 31 is set to the UE 31, it transmits an allocation execution report message to the center node 20 (S65). The allocation execution report message may indicate, for example, an area of an autonomously-set radio resource allocated to the UE. The amount of an autonomously-set radio resource(s) allocated to a UE changes according to, for example, the number of UEs to which the autonomously-set radio resource is allocated by scheduling or the amount of data transmitted/received by the UE. For example, when the number of UEs each of which retransmits uplink data is large or when the amount of uplink data to be retransmitted is large, most of the autonomously-set radio resource(s) is allocated to the UE(s). On the other hand, when the number of UEs each of which retransmits uplink data is small or when the amount of uplink data to be retransmitted is small, a radio resource(s) that is not allocated to any UE among the autonomously-set radio resources increases.

The allocation execution report message may indicate, for example, an amount of a radio resource(s) that has been allocated to a UE(s) among the autonomously-set radio resources.

Figure 13:
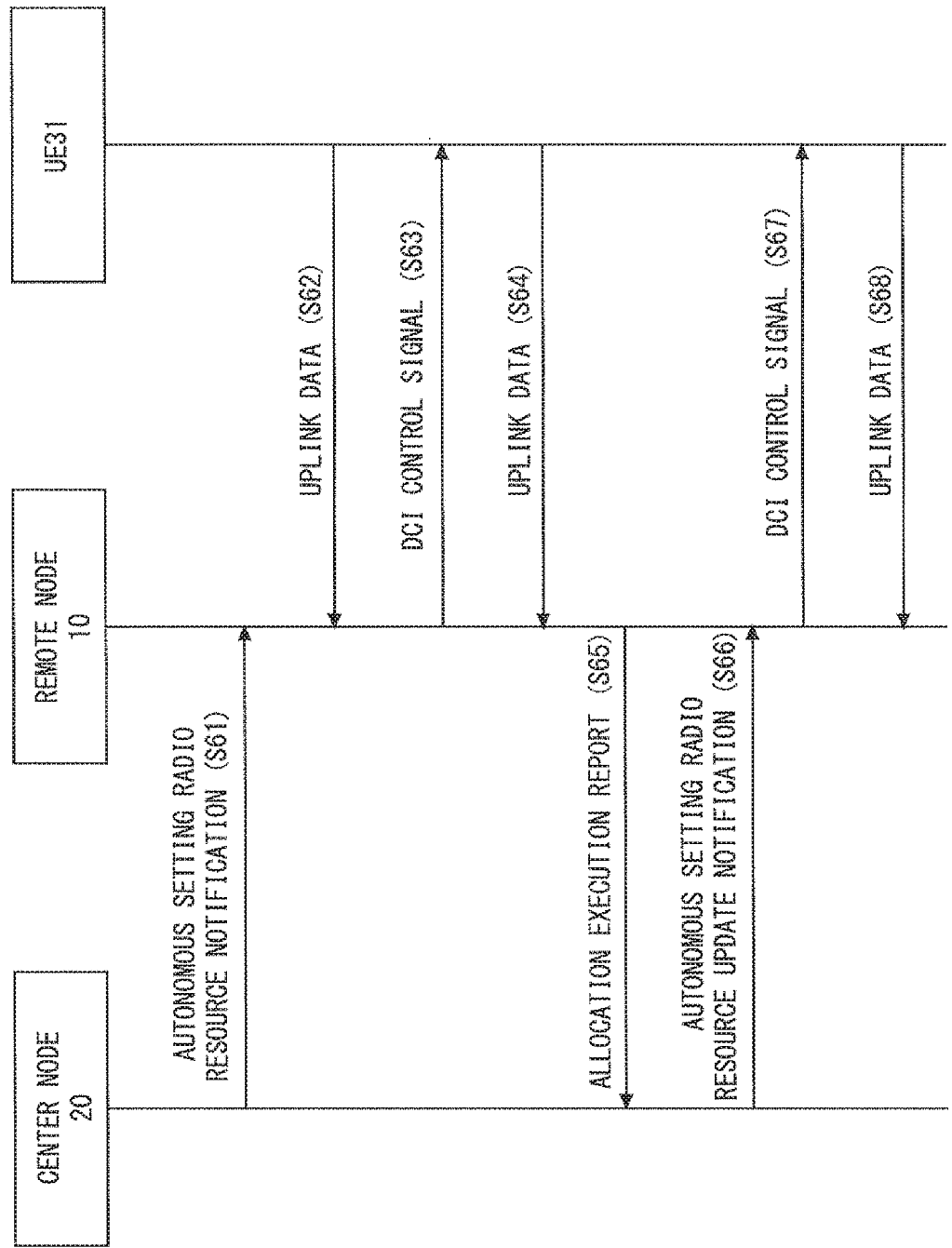
FIG. 13 is a diagram showing a flow of an autonomously-set radio resource update process that is performed when uplink data is transmitted according to a fourth embodiment.

FIG. 13 shows that after the remote node 10 receives uplink data in the step S64, it transmits an allocation execution report message to the center node 20. However, the remote node 10 may transmit the allocation execution report message to the center node 20 before receiving the uplink data in the step S64.

Next, upon receiving the allocation execution report message from the remote node 10, the center node 20 updates the autonomously-set radio resources and transmits an autonomously-set radio resource update notification message to the remote node 10 (S66).

When the allocation execution report message indicates that, for example, the amount of the radio resource allocated to the UE among the autonomously-set radio resources exceeds a predefined threshold, the center node 20 may update the autonomously-set radio resources so that the autonomously-set radio resource notified to the remote node 10 in the step S61 is increased. Further, when the allocation execution report message indicates that the amount of the radio resource allocated to the UE among the autonomously-set radio resources is smaller than the predefined threshold, the center node 20 may update the autonomously-set radio resources so that the autonomously-set radio resource notified to the remote node 10 in the step S61 is decreased.

Steps S67 and S68 are similar to the steps S63 and S64 and therefore their detailed explanations are omitted.

Next, a flow of an autonomously-set radio resource update process that is performed when downlink data is transmitted according to the fourth embodiment is explained with reference to FIG. 14. Steps S71 to S75 in FIG. 13 are similar to the steps S11 to S15 in FIG. 9 and therefore their detailed explanations are omitted.

After the remote node 10 performs scheduling for an autonomously-set radio resource and transmits a DCI control signal in which information about a radio resource allocated to the UE 31 is set to the UE 31, it transmits an allocation execution report message to the center node 20 (S76). For example, when the number of UEs to each of which downlink data is retransmitted is large or when the amount of retransmitted downlink data is large, most of the autonomously-set radio resource is allocated to the UE. On the other hand, when the number of UEs to each of which downlink data is retransmitted is small or when the amount of retransmitted downlink data is small, the radio resource that is not allocated to any UE among the autonomously-set radio resource increases.

Figure 14:
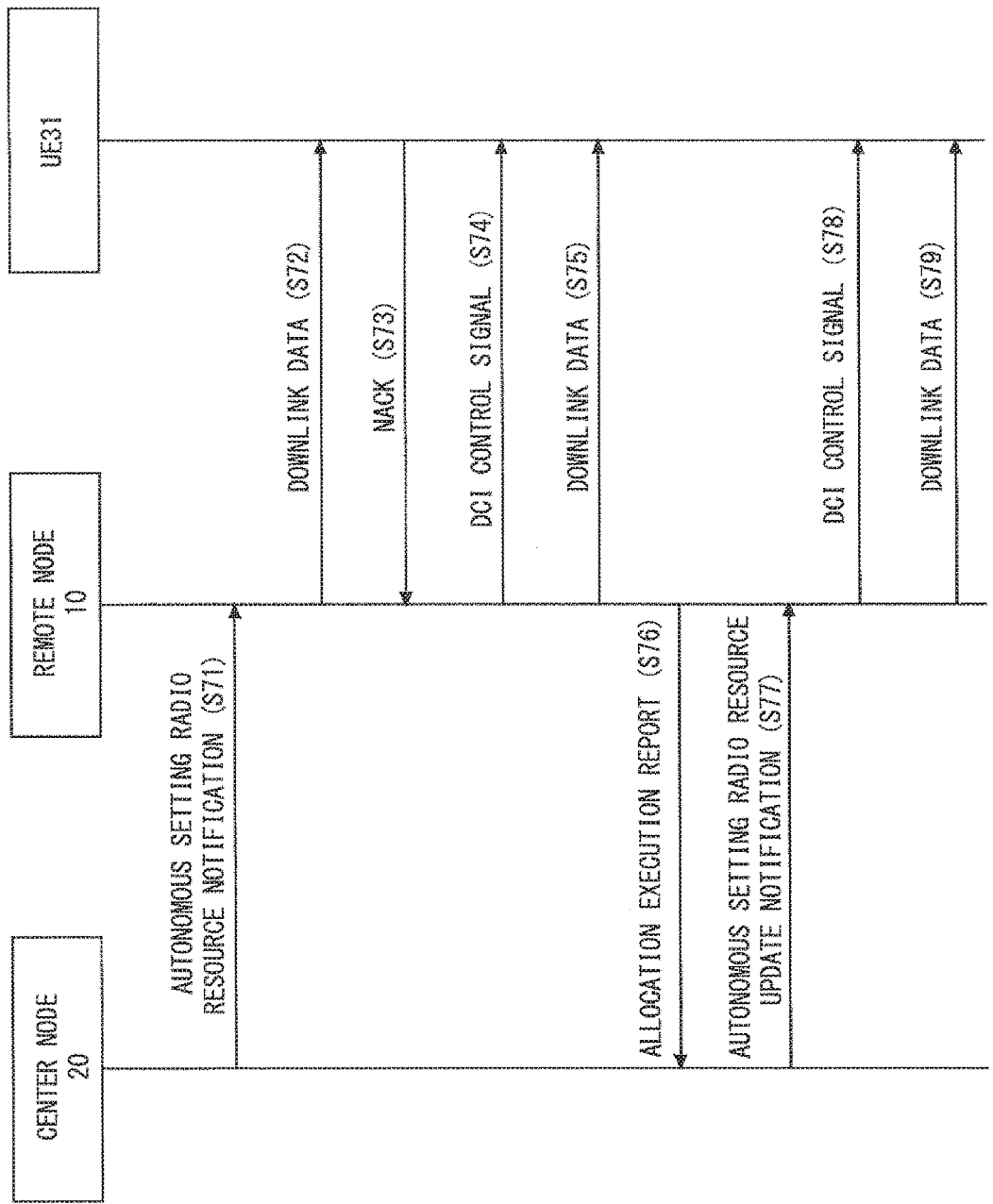
FIG. 14 is a diagram showing a flow of an autonomously-set radio resource update process that is performed when downlink data is transmitted according to the fourth embodiment.

FIG. 14 shows that after the remote node 10 transmits downlink data in the step S75, it transmits an allocation execution report message to the center node 20. However, the remote node 10 may transmit the allocation execution report message to the center node 20 before receiving the downlink data in the step S75.

Next, upon receiving the allocation execution report message from the remote node 10, the center node 20 updates the autonomously-set radio resources and transmits an autonomously-set radio resource update notification message to the remote node 10 (S77).

Steps S78 and S79 are similar to the steps S74 and S75 and therefore their detailed explanations are omitted.

Figure 15:
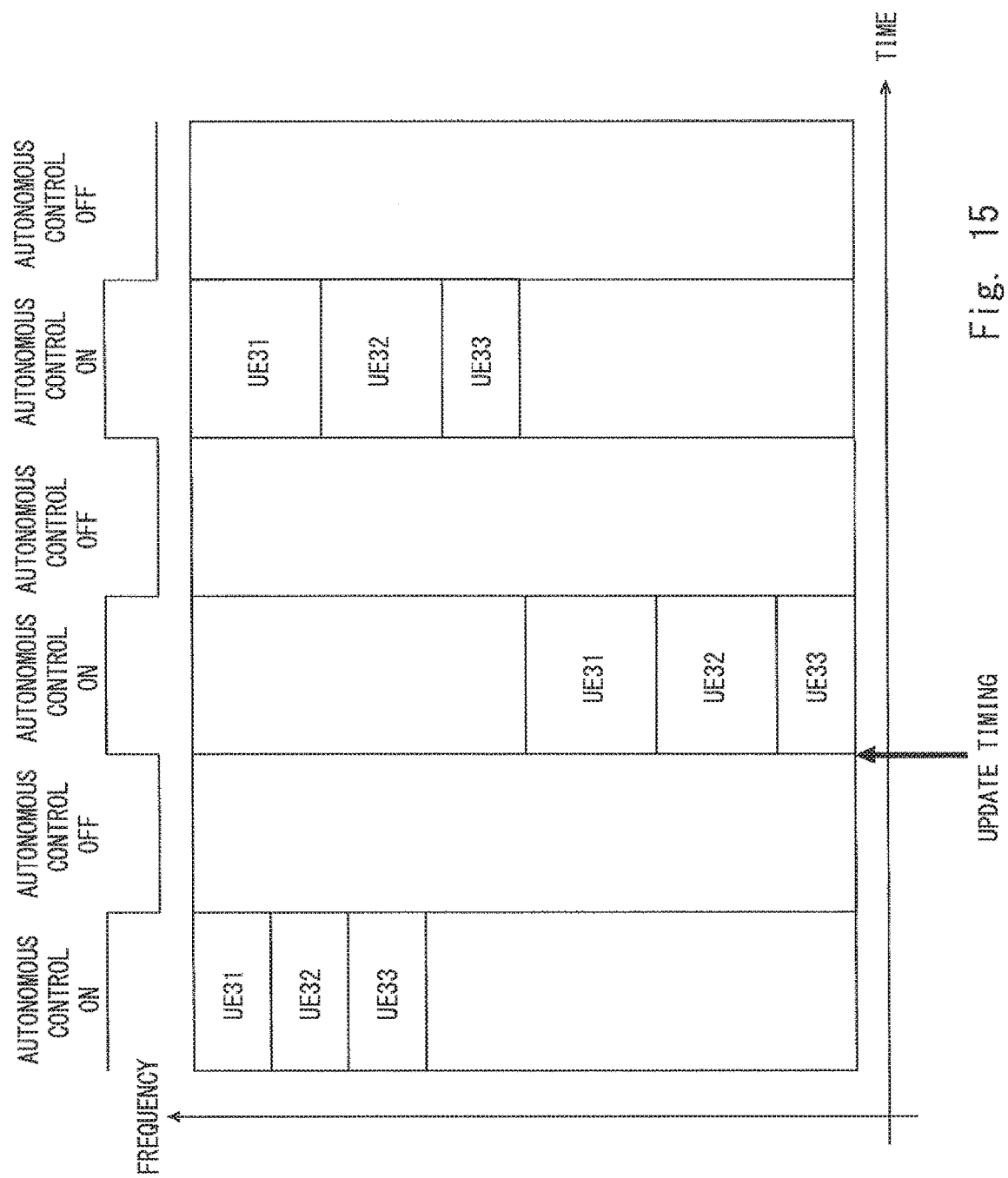
FIG. 15 shows an example of updated autonomously-set radio resource according to the fourth embodiment.

Next, an example of updated autonomously-set radio resources according to the fourth embodiment is explained with reference to FIG. 15. FIG. 15 shows that autonomously-set radio resources are updated at an update timing. Specifically, FIG. 15 shows that autonomously-set radio resources are updated and thereby are increased. FIG. 15 shows that although the periods in which autonomous control for the autonomously-set radio resources becomes an On-state do not change from those before the update timing, frequencies used as autonomously-set radio resources are increased. Further, FIG. 15 shows that the scheduler 11 increases the frequency resources allocated to the UEs 31 and 32.

Figure 16:
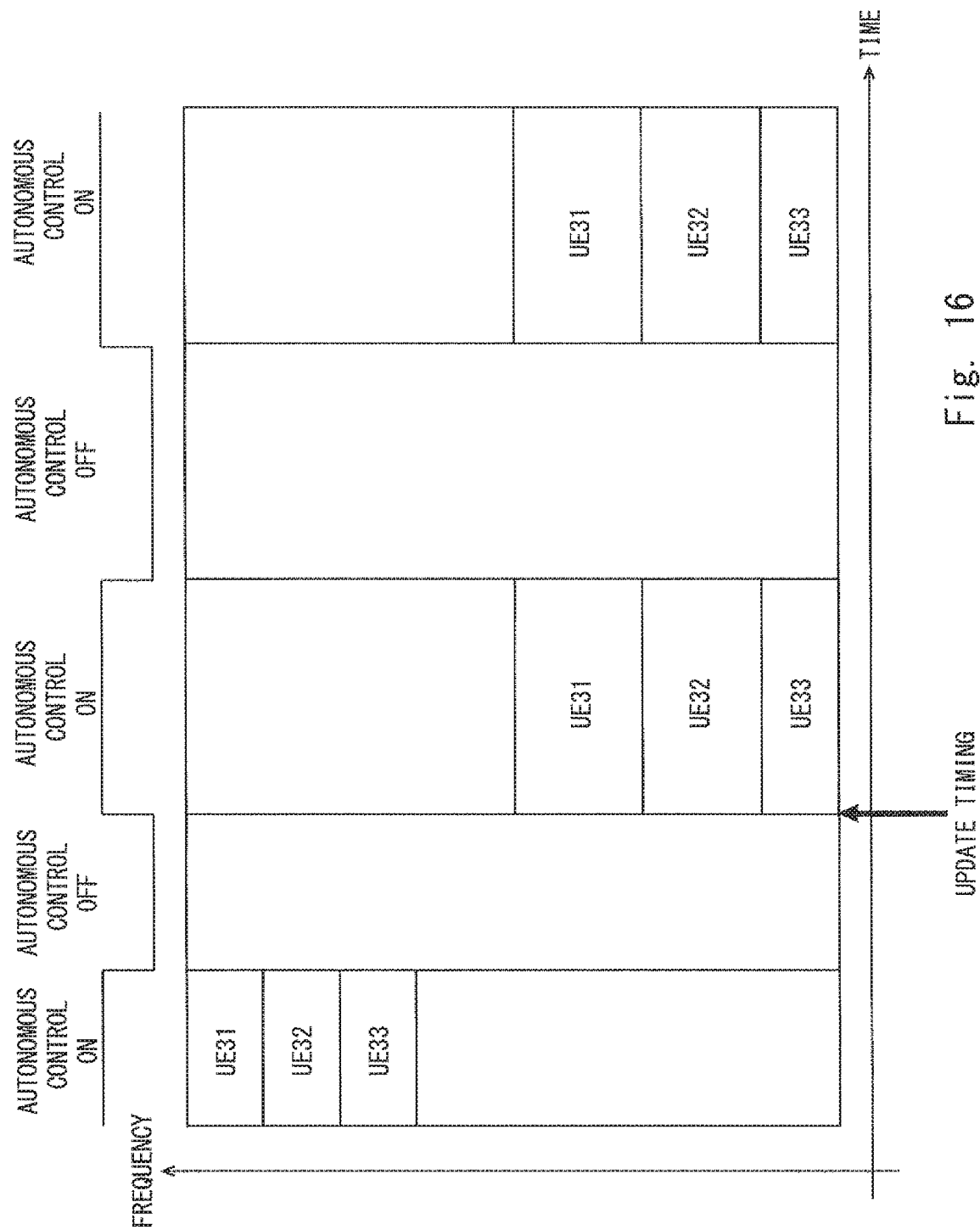
FIG. 16 shows an example of updated autonomously-set radio resource according to the fourth embodiment.

Next, another example, i.e., an example different from that shown in FIG. 15 of updated autonomously-set radio resources according to the fourth embodiment is explained with reference to FIG. 16. FIG. 16 shows that autonomously-set radio resources are updated and thereby are increased. FIG. 16 shows that the periods in which autonomous control for the autonomously-set radio resources becomes an On-state become longer than those before the update timing, and frequencies used as autonomously-set radio resources are increased. Further, FIG. 16 shows that the scheduler 11 increases the frequency resources allocated to the UEs 31 and 32. The scheduler 11 increases all the time resources allocated to the UEs 31, 32 and 33.

Although FIG. 16 shows that both of the time resources and the frequency resources are increased after the update timing, only the time resources may be increased.

Figure 17:
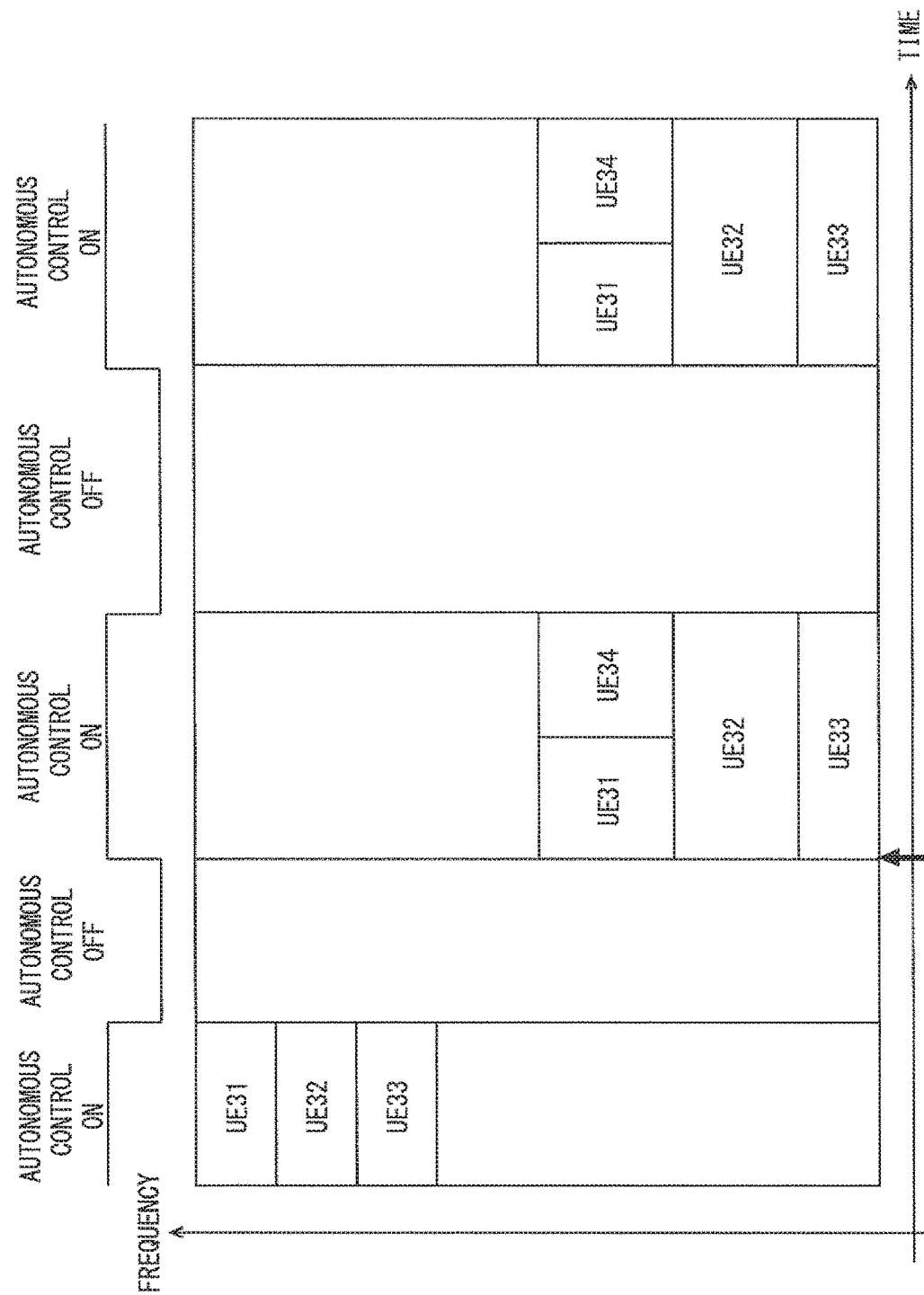
FIG. 17 shows an example of updated autonomously-set radio resource according to the fourth embodiment.

Next, another example, i.e., an example different from those shown in FIGS. 15 and 16 of updated autonomously-set radio resources according to the fourth embodiment is explained with reference to FIG. 17. FIG. 17 shows that autonomously-set radio resources are updated and thereby are increased. FIG. 17 shows that the periods in which autonomous control for the autonomously-set radio resources becomes an On-state become longer than those before the update timing, and frequencies used as autonomously-set radio resources are increased. Further, FIG. 17 shows that the scheduler 11 decreases the time resource allocated to the UE 31 and newly allocates a time resource to a UE 34. Further, FIG. 17 shows that the scheduler 11 increases the frequency resources allocated to the UEs 31 and 32, and increases the time resources allocated to the UEs 32 and 33.

Although FIGS. 15 to 17 show examples in which autonomously-set radio resources are increased, there are cases in which autonomously-set radio resources are decreased. When the autonomously-set radio resource is decreased, the scheduler 11 may reduce a radio resource allocated to a UE or reduce the number of UEs to which radio resources are allocated.

As explained above, it is possible to change time periods and frequency bands of autonomously-set radio resources by performing an autonomously-set radio resource update process according to the fourth embodiment. The center node 20 can recognize excess/shortage of autonomously-set radio resources by receiving an allocation execution report message. In this way, the center node 20 can increase/decrease the autonomously-set radio resources according to the used state of the autonomously-set radio resources and hence set an appropriate amount of autonomously-set radio resources. The remote node 10 may transmit an allocation execution report message to the center node 20 a plurality of times. The center node 20 may perform an autonomously-set radio resource update process every time it receives an allocation execution report message. That is, the center node 20 may perform an autonomously-set radio resource update process a plurality of times.

Note that in the fourth embodiment, an example in which the center node 20 changes the autonomously-set radio resources according to the used state of the autonomously-set radio resources or the allocation state thereof. However, the center node 20 may change the autonomously-set radio resources according to information other than the used state of the autonomously-set radio resource and the allocation state thereof.

For example, the center node 20 may change or update the autonomously-set radio resources according to a congestion state of a radio communication path between the remote node 10 and the UE 31, radio communication quality thereof, the priority of a low-delay service, or the like.

Figure 18:
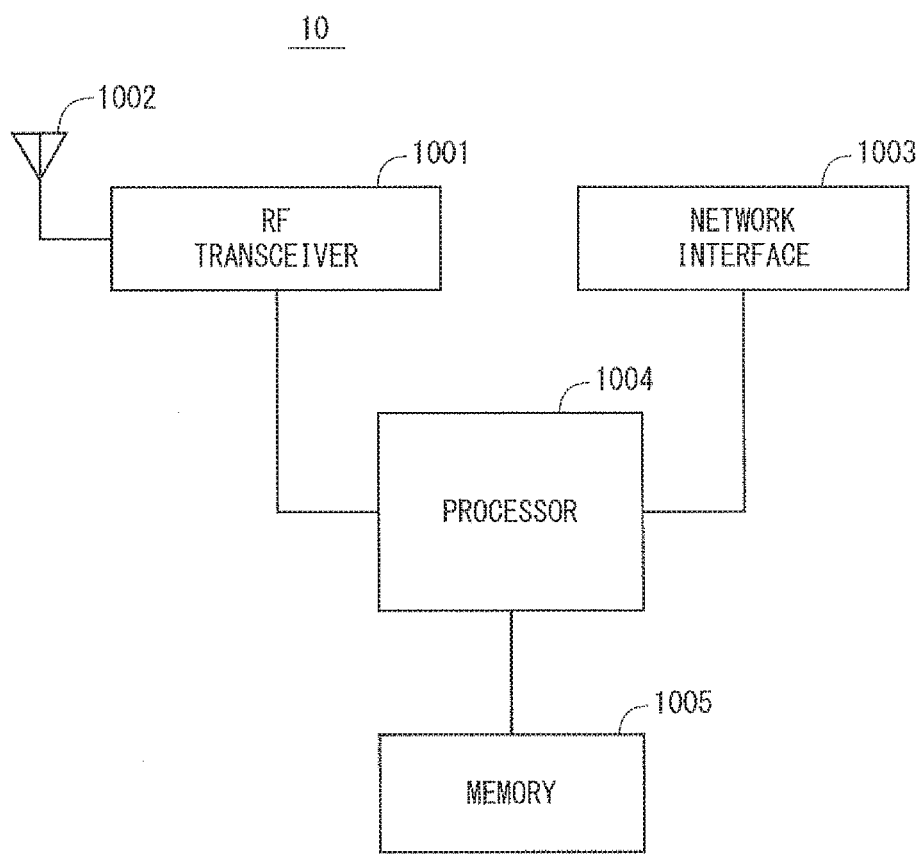
FIG. 18 is a configuration diagram of a remote node in each embodiment.

Next, configuration examples of the remote node 10, the center node 20, the communication terminal 30, and the UE 31, which are explained in the above-described plurality of embodiments, are explained hereinafter. FIG. 18 is a block diagram showing a configuration example of the remote node 10. As shown in FIG. 18, the remote node 10 includes an RF transceiver 1001, a network interface 1003, a processor 1004, and a memory 1005. The RF transceiver 1001 performs an analog RF signal process in order to communicate with UEs. The RF transceiver 1001 may include a plurality of transceivers. The RF transceiver 1001 is connected to an antenna 1002 and the processor 1004. The RF transceiver 1001 receives modulation symbol data (or OFDM symbol data) from the processor 1004, generates a transmission RF signal, and supplies the generated transmission RF signal to the antenna 1002. Further, the RF transceiver 1001 generates a baseband reception signal based on a reception RF signal received through the antenna 1002 and supplies the generated baseband reception signal to the processor 1004.

The network interface 1003 is used for communication with a network node (e.g., other remote nodes and the center node 20). The network interface 1003 may include, for example, a network interface card (NIC) in conformity with IEEE 802.3 series.

The processor 1004 performs a data-plane process including a digital baseband signal process for radio communication and a control-plane process. For example, in the case of LTE or LTE-Advanced, the digital baseband signal process performed by the processor 1004 may include signal processes in a MAC layer and a PHY layer.

The processor 1004 may include a plurality of processors. For example, the processor 1004 may include a modem-processor (e.g., a DSP) that performs a digital baseband signal process and a protocol-stack-processor (e.g., a CPU or an MPU) that performs a control-plane process.

The memory 1005 is formed by a combination of a volatile memory and a nonvolatile memory. The memory 1005 may include a plurality of physically-independent memory devices. The volatile memory is, for example, a Static Random Access Memory (SRAM), a Dynamic RAM (DRAM), or a combination thereof. The nonvolatile memory is, for example, a Read Only Memory (MROM), an Electrically Erasable Programmable ROM (EEPROM), a flash memory, a hard disk drive, or a combination thereof. The memory 1005 may include a storage disposed apart from the processor 1004. In this case, the processor 1004 may access the memory 1005 through the network interface 1003 or an I/O interface (not shown).

The memory 1005 may store a software module (a computer program) including a group of instructions and data for performing processes performed by the remote node 10 explained in the above-described plurality of embodiments. In some implementations, the processor 1004 may be configured so that it performs processes performed by the remote node 10 explained in the above-described embodiments by reading the software module from the memory 1005 and executing the read software module.

Figure 19:
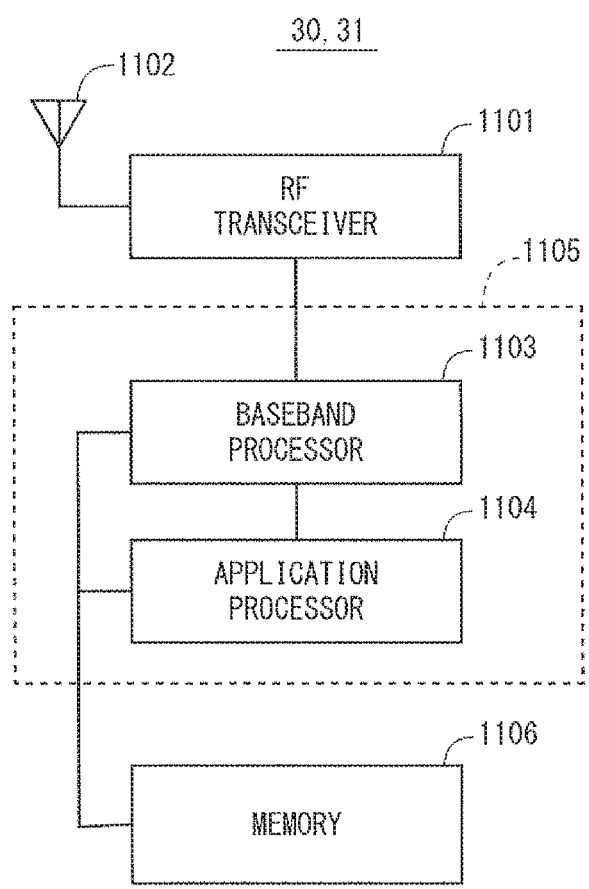
FIG. 19 is a configuration diagram of a communication terminal and a UE in each embodiment.

FIG. 19 is a block diagram showing a configuration example of the communication terminal 30 and the UE 31. A Radio Frequency (RF) transceiver 1101 performs an analog RF signal process in order to communicate with the remote node 10. The analog RF signal process performed by the RF transceiver 1101 includes a frequency up-conversion, a frequency down-conversion, and amplification. The RF transceiver 1101 is connected to an antenna 1102 and a baseband processor 1103. That is, the RF transceiver 1101 receives modulation symbol data (or OFDM symbol data) from the baseband processor 1103, generates a transmission RF signal, and supplies the generated transmission RF signal to the antenna 1102. Further, the RF transceiver 1101 generates a baseband reception signal based on a reception RF signal received through the antenna 1102 and supplies the generated baseband reception signal to the baseband processor 1103.

The baseband processor 1103 performs a digital baseband signal process for radio communication (a data-plane process) and a control-plane process. The digital baseband signal process includes (a) data compression/restoration, (b) data segmentation/concatenation, (c) transmission format (transmission frame) generation/decomposition, (d) transmission path encoding/decoding, (e) modulation (symbol mapping), (f) OFDM symbol data (baseband OFDM signal) generation by Inverse Fast Fourier Transform (IFFT), and so on. Meanwhile, the control-plane process includes communication management in a layer 1 (e.g., transmission power control), a layer 2 (e.g., radio resource management and a hybrid automatic repeat request (HARQ)), and a layer 3 (e.g., attach, mobility, and signaling related to telephone-call management).

For example, in the case of LTE or LTE-Advanced, the digital baseband signal process performed by the baseband processor 1103 may include signal processes in a Packet Data Convergence Protocol (PDCP) layer, a Radio Link Control (RLC) layer, a MAC layer, and a PHY layer. Further, the control-plane process performed by the baseband processor 1103 may include a Non-Access Stratum (NAS) protocol, an RRC protocol, and a MAC CE process.

The baseband processor 1103 may include a modem-processor (e.g., a Digital Signal Processor (DSP)) that performs a digital baseband signal process and a protocol-stack-processor (e.g., a Central Processing Unit (CPU), or a Micro Processing Unit (MPU)) that performs a control-plane process. In this case, the same processor (i.e., one processor) may be used as both the aforementioned protocol-stack-processor that performs a control-plane process and a later-described application processor 1104.

The application processor 1104 is also referred to as a CPU, an MPU, a microprocessor, or a processor core. The application processor 1104 may include a plurality of processors (or a plurality of processor cores). The application processor 1104 implements various functions of the remote node 10 and the UE 30 by executing a system software program (Operating System (OS)) and various application programs (e.g., a telephone-call application, a WEB browser, a mailer, a cameral operation application, and a music playback application) read from a memory 1106 or other memories (not shown).

In some implementations, the baseband processor 1103 and the application processor 1104 may be integrally disposed (or formed) on one semiconductor chip as indicated by broken lines (1105) in FIG. 19. In other words, the baseband processor 1103 and the application processor 1104 may be implemented as one System on Chip (SoC) device 1105. The SoC device may also be called a system LSI (Large Scale Integration) or a chip set.

The memory 1106 is a volatile memory, a nonvolatile memory, or a combination thereof. The memory 1106 may include a plurality of physically-independent memory devices. The volatile memory is, for example, a Static Random Access Memory (SRAM), a Dynamic RAM (DRAM), or a combination thereof. The nonvolatile memory is, for example, a Read Only Memory (MROM), an Electrically Erasable Programmable ROM (EEPROM), a flash memory, a hard disk drive, or a combination thereof. For example, the memory 1106 may include an external memory device that can be accessed by the baseband processor 1103, the application processor 1104, and the SoC 1105. The memory 1106 may include an internal memory device integrally disposed (or formed) in the baseband processor 1103, the application processor 1104, or the SoC 1105. Further, the memory 1106 may include a memory disposed in a Universal Integrated Circuit Card (UICC).

The memory 1106 may store a software module (a computer program) including a group of instructions and data for performing processes performed by the communication terminal 30 and the UE 31 explained in the above-described plurality of embodiments. In some implementations, the baseband processor 1103 or the application processor 1104 may be configured so that it performs processes performed by the communication terminal 30 and the UE 31 explained in the above-described embodiments by reading the software module from the memory 1106 and executing the read software module.

Figure 20:
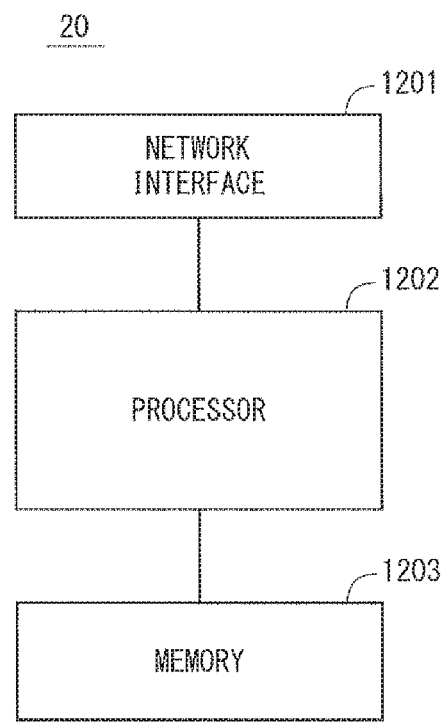
FIG. 20 is a configuration diagram of a center node in each embodiment.

FIG. 20 is a block diagram showing a configuration example of the center node 20. As shown in FIG. 20, the center node 20 includes a network interface 1201, a processor 1202, and a memory 1203. The network interface 1201 is used for communication with a network node (e.g., the remote node 10 and the core network 40). The network interface 1201 may include, for example, a network interface card (NIC) in conformity with IEEE 802.3 series.

The processor 1202 performs processes performed by the center node 20 explained with reference to the sequence diagrams and the flowcharts in the above-described embodiments by reading a software module from the memory 1203 and executing the read software module. The processor 1202 may be, for example, a microprocessor, an MPU, or a CPU. The processor 1202 may include a plurality of processors.

The processor 1202 performs a data-plane process including a digital baseband signal process for radio communication, and a control-plane process. For example, in the case of LTE or LTE-Advanced, the digital baseband signal process performed by the processor 1202 may include signal processes in a PDCP layer, an RLC layer, and a MAC layer. Further, the signal process performed by the processor 1202 may include signal processes in a GTP-U•UDP/IP layer in an X2-U interface and an S1-U interface. Further, the control-plane process performed by the processor 1202 may include processes in accordance with an X2AP protocol, an S1-MME protocol, and an RRC protocol.

The processor 1202 may include a plurality of processors. For example, the processor 1004 may include a modem-processor (e.g., a DSP) that performs a digital baseband signal process, a processor (e.g., a DSP) that performs signal processes in a GTP-U•UDP/IP layer in an X2-U interface and an S1-U interface, and a protocol-stack-processor (e.g., a CPU or an MPU) that performs a control-plane process.

The memory 1203 is formed by a combination of a volatile memory and a nonvolatile memory. The memory 1203 may include a storage disposed apart from the processor 1202. In this case, the processor 1202 may access the memory 1203 through an I/O interface (not shown).

In the example shown in FIG. 20, the memory 1203 is used to store a group of software modules. The processor 1202 can perform processes performed by the center node 20 explained in the above-described embodiments by reading the group of software modules from the memory 1203 and executing the read software modules.

As explained above with reference to FIGS. 18 and 20, each of the processors included in the remote node 10, the center node 20, the communication terminal 30, and the UE 31 in the above-described embodiments executes one or a plurality of programs including a group of instructions to cause a computer to perform an algorithm explained above with reference to the drawings.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above-described embodiments and can be modified as appropriate without departing from the spirit and scope of the present disclosure. Further, the present disclosure may be implemented by combining the above-described embodiments with one another.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A remote node comprising:
   at least one memory storing instructions; and
   at least one processor configured to execute the instructions to:
   perform scheduling for a first radio resource among radio resources available for radio communication, the first radio resource being a radio resource designated in advance by a center node; and
   perform radio communication with a communication terminal by using the first radio resource or a second radio resource among the radio resources available for radio communication, the second radio resource being a radio resource for which the scheduling has been performed by the center node,
   wherein the at least one processor is further configured to:
   perform the scheduling for the first radio resource and allocate the first radio resource to a second communication terminal that transmits uplink data,
   receive the uplink data transmitted from the second communication terminal by using the first radio resource, and
   perform the scheduling for the first radio resource based on identification information of the second communication terminal included in a message requesting scheduling to transmit the uplink data from the second communication terminal, and determine whether or not to allocate the first radio resource to the second communication terminal when receiving the message.

2. The remote node according to claim 1, wherein the at least one processor of the remote node is further configured to execute the instructions to perform scheduling for the first radio resource and allocate the first radio resource to a first communication terminal that receives retransmitted downlink data, and retransmit the downlink data to the first communication terminal by using the first radio resource.

3. The remote node according to claim 1, wherein the at least one processor of the remote node is further configured to execute the instructions to perform scheduling for the first radio resource so that the second communication terminal retransmits the uplink data and allocate the first radio resource to the second communication terminal when failing in decoding of uplink data transmitted from the second communication terminal.

4. The remote node according to claim 1, wherein the at least one processor of the remote node is further configured to execute the instructions to transmit information about a result of scheduling for the first radio resource to the center node.

5. The remote node according to claim 4, wherein the at least one processor of the remote node is further configured to execute the instructions to receive information about an updated first radio resource from the center node after transmitting the information about the result of the scheduling for the first radio resource to the center node.

6. The remote node according to claim 1, wherein the first radio resource includes information on a time period available to the communication terminal and information on a frequency band available to the communication terminal are designated.

7. The remote node according to claim 6, wherein the information on the time period indicates at least one of a period that is available to the communication terminal and a period that is not available to the communication terminal, and a cycle in which at least one of the period available to the communication terminal and the period not available to the communication terminal occurs.

8. The remote node according to claim 6, wherein the information on the frequency band indicates a start frequency and an end frequency.

9. The remote node according to claim 6, wherein the information on the frequency band indicates a start frequency and a width of a frequency band available to the communication terminal.

10. A center node comprising:
at least one memory storing instructions; and
at least one processor configured to execute the instructions to:
designate a first radio resource among radio resources available for radio communication in a remote node, the first radio resource being a radio resource for which the remote node autonomously performs scheduling; and
transmit information about the first radio resource to the remote node that performs radio communication with a communication terminal by using the first radio resource,
wherein the at least one processor is further configured to:
receive information about a result of scheduling for the first radio resource transmitted front the remote node,
update the first radio resource based on the information about the result of the scheduling for the first radio resource, and
increase the first radio resource when the remote node has allocated an amount of the first radio resource larger than a predetermined threshold to the communication terminal, and decrease the first radio resource when the remote node has allocated an amount of the first radio resource smaller than the predetermined threshold to the communication terminal.

11. A communication method comprising:
performing scheduling for a first radio resource among radio resources available for radio communication, the first radio resource being a radio resource designated in advance by a center node; and
performing radio communication with a communication terminal by using the first radio resource or a second radio resource among the radio resources available for radio communication, the second radio resource being a radio resource for which scheduling has been performed by the center node,
wherein the communication method further comprises:
performing the scheduling for the first radio resource and allocating the first radio resource to a second communication terminal that transmits uplink data,
receiving the uplink data transmitted from the second communication terminal by using the first radio resource, and
performing the scheduling for the first radio resource based on identification information of the second communication terminal included in a message requesting scheduling to transmit the uplink data from the second communication terminal, and determine whether or not to allocate the first radio resource to the second communication terminal when receiving the message.

* * * * *